(12) United States Patent
Kono et al.

(10) Patent No.: US 11,275,358 B2
(45) Date of Patent: Mar. 15, 2022

(54) REMOTE SERVICE SYSTEM

(71) Applicant: Mitsubishi Hitachi Power Systems, Ltd., Yokohama (JP)

(72) Inventors: Takayuki Kono, Tokyo (JP); Kenji Takao, Tokyo (JP); Daisuke Goto, Tokyo (JP); Hiroyasu Ishigaki, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 101 days.

(21) Appl. No.: 16/961,456

(22) PCT Filed: Nov. 5, 2018

(86) PCT No.: PCT/JP2018/041065
§ 371 (c)(1),
(2) Date: Jul. 10, 2020

(87) PCT Pub. No.: WO2019/138668
PCT Pub. Date: Jul. 18, 2019

(65) Prior Publication Data
US 2021/0080935 A1      Mar. 18, 2021

(30) Foreign Application Priority Data

Jan. 15, 2018 (JP) .............................. JP2018-004430

(51) Int. Cl.
*G05B 19/418*      (2006.01)
(52) U.S. Cl.
CPC .................. *G05B 19/4185* (2013.01); *G05B 2219/31105* (2013.01)

(58) Field of Classification Search
None
See application file for complete search history.

(56) References Cited

U.S. PATENT DOCUMENTS

| 2005/0165939 A1 | 7/2005 | Nikunen et al. |
| 2007/0136818 A1 | 6/2007 | Blumberg et al. |

(Continued)

FOREIGN PATENT DOCUMENTS

| JP | 11-025196 | 1/1999 |
| JP | 2005-339312 | 12/2005 |

(Continued)

OTHER PUBLICATIONS

International Search Report dated Jan. 29, 2019 in International (PCT) Application No. PCT/JP2018/041065 with English translation.

(Continued)

*Primary Examiner* — Philip Wang
(74) *Attorney, Agent, or Firm* — Wenderoth, Lind & Ponack, L.L.P.

(57) ABSTRACT

A remote service system includes a first computer terminal configured to add a first signature to control information representing control content to be applied to a facility and transmit the control information and a second computer terminal configured to cause the control content represented by the control information to be applied to the facility, wherein the first computer terminal and the second computer terminal are connected by a first communication network and wherein the second computer terminal and the facility are connected by a second communication network.

24 Claims, 13 Drawing Sheets

(56) References Cited

U.S. PATENT DOCUMENTS

| | | | |
|---|---|---|---|
| 2010/0011216 A1 | 1/2010 | Holm-Hansen et al. | |
| 2012/0246535 A1* | 9/2012 | Kagan | H04L 67/1097 |
| | | | 714/752 |
| 2013/0290706 A1* | 10/2013 | Socky | H04L 63/0823 |
| | | | 713/158 |
| 2014/0346222 A1* | 11/2014 | Mastykarz | G06F 21/602 |
| | | | 235/375 |
| 2015/0046697 A1* | 2/2015 | Galpin | G09C 1/00 |
| | | | 713/155 |
| 2017/0163733 A1* | 6/2017 | Grefen | H04L 9/3236 |
| 2017/0318011 A1* | 11/2017 | Yoo | H04L 63/0428 |

FOREIGN PATENT DOCUMENTS

| | | |
|---|---|---|
| JP | 4714582 | 6/2011 |
| JP | 2011-527806 | 11/2011 |
| JP | 2013-219535 | 10/2013 |
| JP | 2013-232192 | 11/2013 |
| JP | 2017-059873 | 3/2017 |
| WO | 2017/167549 | 10/2017 |
| WO | 2018/006945 | 1/2018 |

OTHER PUBLICATIONS

Written Opinion of the International Searching Authority dated Jan. 29, 2019 in International (PCT) Application No. PCT/JP2018/041065 with English translation.

* cited by examiner

REMOTE SERVICE SYSTEM

TECHNICAL FIELD

The present disclosure relates to a remote service system.

Priority is claimed on Japanese Patent Application No. 2018-004430, filed Jan. 15, 2018, the content of which is incorporated herein by reference.

BACKGROUND ART

In a plant such as a power generation plant, a parameter value set in a facility is changed by control equipment that controls each facility so that setting conditions of the facility are changed. In conventional plants, a service staff member of a service provider dispatched to an actual place makes a change in a parameter value set by control equipment in a facility, a change in a setting of the facility, and the like while obtaining confirmation from a staff member or the like of the plant. Thus, the work of changing a setting condition of a facility in the plant is time-consuming and is costly work. For this reason, it is desired that a change in a setting condition of a facility in the plant, i.e., a change or adjustment in a parameter value set by the control equipment in the facility, a change in a setting of the facility, or the like, be performed from a remote place using a network such as the Internet.

Therefore, for example, technology of a remote service system using a network in a plant has been proposed as in Patent Literature 1. In the technology of the remote service system disclosed in Patent Literature 1, a controller, which controls a field device, operates by performing mutual authentication with a remote device connected via a network. At this time, in the technology of the remote service system disclosed in Patent Literature 1, a certificate issued by a security authority is used for mutual authentication between the controller and the remote device. Thereby, in the technology of the remote service system disclosed in Patent Literature 1, the possibility of unauthorized use of the remote service system or the controller is curbed and the remotely operated controller is protected.

CITATION LIST

Patent Literature

[Patent Literature 1]

Japanese Unexamined Patent Application, First Publication No. 2013-232192

SUMMARY OF INVENTION

Technical Problem

On the other hand, in plants, the verification of the correctness of change content or sufficient consideration, which is given to intrusions and attacks from a malicious third party, is required for a change or adjustment in a parameter value set by control equipment in a facility, a change in a setting of the facility, and the like.

At least one embodiment of the present invention has been made on the basis of the above problems and an objective of the present invention is to provide a remote service system capable of correctly changing settings with maintaining a security level of setting data when a setting condition of a facility in a plant is changed from a remote place.

Solution to Problem

According to an aspect of the present invention, there is provided a remote service system including: a first computer terminal configured to add a first signature to control information representing control content to be applied to a facility and transmit the control information; and a second computer terminal configured to cause the control content represented by the control information to be applied to the facility, wherein the first computer terminal and the second computer terminal are connected by a first communication network and wherein the second computer terminal and the facility are connected by a second communication network.

According to another aspect of the present invention, the above-described remote service system may further include a third computer terminal connected to the first communication network and configured to further add a second signature to the control information and transmit the control information when the first signature added to the control information is a correct signature and the control information represents the control content applicable to the facility, wherein the control information may be change information representing change content for changing a setting condition of the facility, wherein the first computer terminal may receive the change content for the facility, add the first signature to the change information representing the received change content, and transmit the change information, wherein the third computer terminal may further add the second signature to the change information and transmit the change information when the first signature added to the change information is a correct signature and the change information represents the change content applicable to the facility, and wherein the second computer terminal may cause the change content represented by the change information to be applied to the facility.

According to another aspect of the present invention, in the above-described remote service system, the second computer terminal may cause the change content represented by the change information to be applied to the facility when the first signature and the second signature added to the change information are correct signatures.

According to another aspect of the present invention, in the above-described remote service system, the change information may include facility identification information for identifying the facility to which the change content is applied.

According to another aspect of the present invention, in the above-described remote service system, the control information may be instruction information representing instruction content for issuing an instruction for executing or stopping an additional function in the facility, the first computer terminal may add the first signature to the instruction information and transmit the instruction information, and the second computer terminal may cause the instruction content represented by the instruction information to be applied to the facility.

According to another aspect of the present invention, in the above-described remote service system, the second computer terminal may cause the instruction content represented by the instruction information to be applied to the facility when the first signature added to the instruction information is a correct signature.

According to another aspect of the present invention, the above-described remote service system may further include a third computer terminal connected to the first communication network and configured to receive a request for executing the additional function in the facility, add a second signature to request information representing the received request, and transmit the request information, wherein the first computer terminal may transmit the instruction information when the second signature added to the request information is a correct signature and the request information is the request applicable to the facility.

According to another aspect of the present invention, in the above-described remote service system, the first communication network may be a public communication network and the second communication network may be a dedicated communication circuit.

According to another aspect of the present invention, in the above-described remote service system, the first communication network may be a communication network in which a block chain is constructed and the second communication network may be a dedicated communication circuit.

According to another aspect of the present invention, in the above-described remote service system, a signature confirmation processing program executed by the block chain may confirm whether or not the first signature is a correct signature.

According to another aspect of the present invention, in the above-described remote service system, the first communication network may be a communication network in which a block chain is constructed and the second communication network may be a dedicated communication circuit directly connected to the facility.

According to another aspect of the present invention, in the above-described remote service system, the instruction information may be encoded using a second key paired with a predetermined first key corresponding to a target facility to which the instruction content is applied.

According to another aspect of the present invention, in the above-described remote service system, the instruction information may be encoded by an encoding processing program executed by the block chain.

According to another aspect of the present invention, in the above-described remote service system, the encoding processing program may transmit a string to the facility and confirm whether or not the first key matches the second key by confirming a signature, which is added to the string and returned by the facility using the first key, using the second key.

According to another aspect of the present invention, in the above-described remote service system, the encoding processing program may encode the instruction information before the second computer terminal causes the instruction content to be applied to the target facility.

According to another aspect of the present invention, in the above-described remote service system, the second computer terminal may transmit an application result transmitted from the facility to which the control content is applied.

According to another aspect of the present invention, in the above-described remote service system, the second computer terminal may transmit the application result transmitted from the facility via a data diode that performs only one-way communication.

According to another aspect of the present invention, in the above-described remote service system, a signature representing the facility to which the control content is applied may be added to the application result.

According to another aspect of the present invention, in the above-described remote service system, the application result may include data for calculating efficiency of the facility.

According to another aspect of the present invention, in the above-described remote service system, the second computer terminal may add a third signature to the application result and transmit the application result.

According to another aspect of the present invention, in the above-described remote service system, the second computer terminal may transmit log information representing that the control content has been transmitted to the facility.

According to another aspect of the present invention, in the above-described remote service system, the second computer terminal may add a third signature to the log information and transmit the log information.

According to another aspect of the present invention, in the above-described remote service system, the second computer terminal may add information of a date and time on which the application result was transmitted from the facility and transmit the information.

According to another aspect of the present invention, in the above-described remote service system, the second computer terminal may transmit the log information to which information of a date and time on which the control content was transmitted to the facility is added.

According to another aspect of the present invention, in the above-described remote service system, the first computer terminal may confirm a delay time period until the control content will be applied to the facility on the basis of the information of the date and time added to the log information and the information of the date and time added to the application result.

Advantageous Effects of Invention

According to the above-described aspects, it is possible to provide a remote service system capable of correctly changing settings with maintaining a security level of setting data when a setting condition of a facility in a plant is changed from a remote place.

DESCRIPTION OF EMBODIMENTS

First Embodiment

Hereinafter, embodiments of the present invention will be described with reference to the drawings. The remote service system according to the first embodiment is a system for changing setting conditions of a facility arranged within a plant such as a power generation plant from a remote place. In the following description, the description will be given under the assumption that the remote service system according to the first embodiment is applied to the power generation plant. In the following description, the description will be given under the assumption that control equipment, which controls a facility, changes parameter values set for the facility so that setting conditions of the facility arranged in the power generation plant are changed in the remote service system according to the first embodiment.

Figure 1:
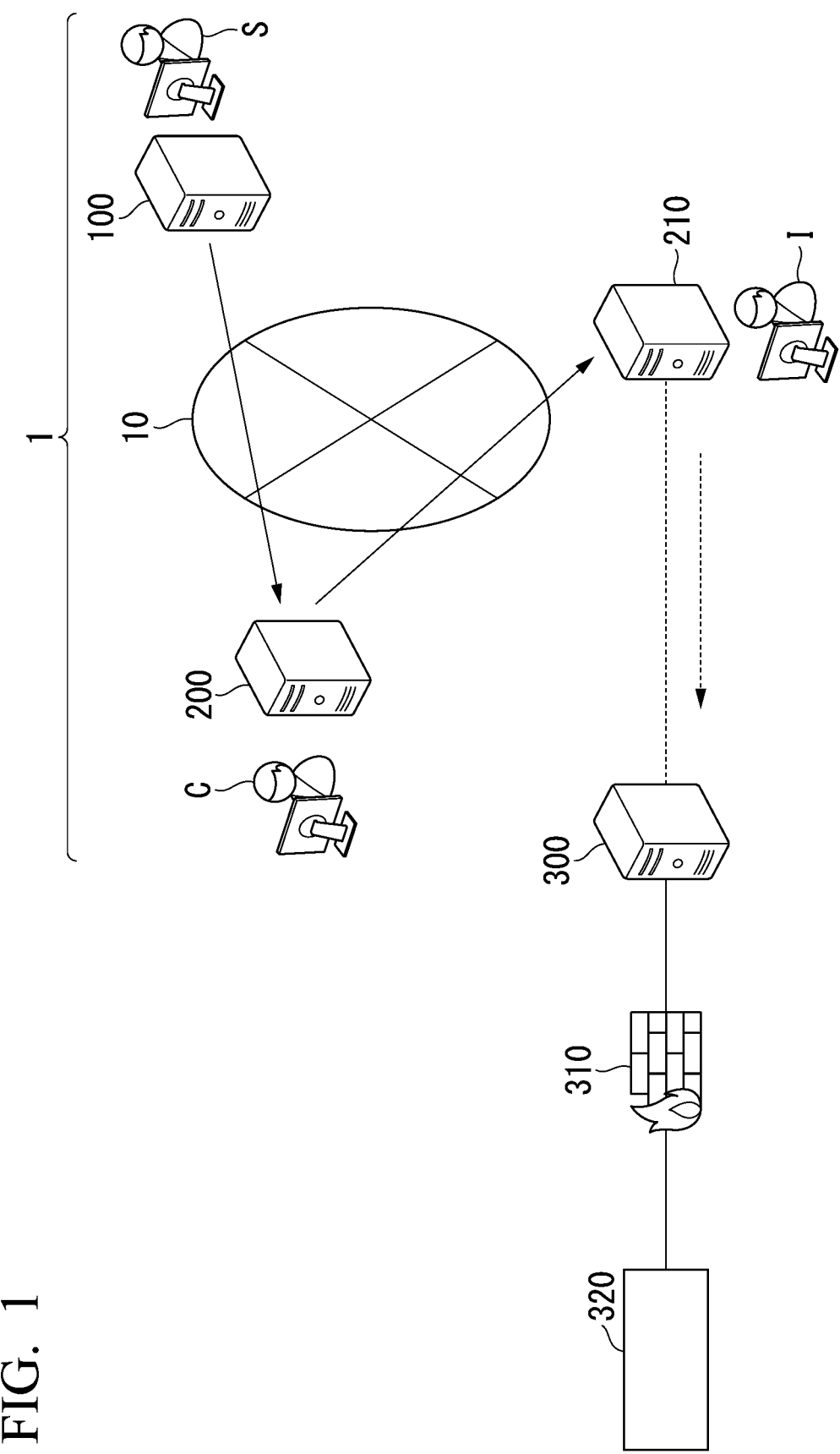
FIG. 1 is a block diagram showing a schematic configuration of a remote service system according to a first embodiment.

FIG. 1 is a block diagram showing a schematic configuration of a remote service system according to the first embodiment. The remote service system 1 is configured to include a change request device 100, a change confirmation device 200, a change execution device 210, and a plant network device 300. In the remote service system 1, each of the change request device 100, the change confirmation device 200, and the change execution device 210 is connected to the network 10. Also, FIG. 1 shows components of the power generation plant for which the remote service system 1 requests a change in setting conditions. More specifically, a firewall 310 and a plant control system 320 are also shown together with the above components.

Although a case in which the firewall 310 is located between the plant network device 300 and the plant control system 320 is shown in FIG. 1, the firewall 310 may be located at any position as long as the firewall 310 is between the change execution device 210 and the plant control system 320. That is, the firewall 310 may be located between the change execution device 210 and the plant network device 300. Also, the firewall 310 may be at both a position between the change execution device 210 and the plant network device 300 and a position between the plant network device 300 and the plant control system 320.

The network 10 is a public communication network such as the Internet.

Each of the change request device 100, the change confirmation device 200, and the change execution device 210 is a computer terminal that is operated by a user using the remote service system 1. For example, each of the change request device 100, the change confirmation device 200, and the change execution device 210 is configured to include a processing device such as a central processing unit (CPU) and various memories such as a read only memory (ROM) and a flash memory storing programs or applications and data necessary for operating the processing device. Therefore, each of the change request device 100, the change confirmation device 200, and the change execution device 210 functions by executing the stored program or application. Also, any one or more of the change request device 100, the change confirmation device 200, and the change execution device 210 may be configured as a dedicated computer terminal to be used by each user. Also, any one or more of the change request device 100, the change confirmation device 200, and the change execution device 210 may include a so-called portable terminal device such as a tablet terminal having a function of a personal computer (PC) or a personal digital assistant (PDA).

The change request device 100 is, for example, a computer terminal operated by a service staff member or the like of a service provider that provides electric power generated in the power generation plant to request a change in a setting condition of a facility arranged in the power generation plant. When a service staff member S of the service provider (hereinafter referred to as a service provider S) inputs change content for changing the setting condition of the facility as control content, the change request device 100 transmits control information representing the input change content (hereinafter referred to as change information) to the change confirmation device 200 via the network 10.

For example, the change confirmation device 200 is a computer terminal to be operated to confirm change content including a problem and the like that may occur in a target facility or a related facility when a staff member or the like who manages setting conditions of facilities arranged within the power generation plant change the setting conditions in accordance with the change content requested from the service provider S. The change confirmation device 200 receives the change information transmitted from the change request device 100 and presents the received change information to a staff member C or the like who confirms the change content of the setting conditions of the facility requested from the service provider S (hereinafter referred to as a change content confirmer C). Also, when the change content confirmer C inputs information representing that the received change information is confirmed to be correct change content (applicable without any problem) with respect to the facility, the change confirmation device 200 transmits the confirmed change information to the change execution device 210 via the network 10.

Also, although the change confirmation device 200 normally confirms the change information transmitted from the change request device 100 and transmits the change information to the change execution device 210, for example, a configuration in which the change confirmation device 200 transmits the change content such as the setting conditions of the facility input by the change content confirmer C to the change confirmation device 200 as the change information under predetermined conditions such as emergency situations may be adopted. In this case, the change confirmation device 200 may directly transmit the change information to the change execution device 210 (or the plant network device 300). Also, the change confirmation device 200 may transmit the change information to the change request device 100 and, after the confirmation by the change request device 100, i.e., the confirmation by the service provider S, is gotten, directly transmit the change information to the change execution device 210 (or the plant network device 300).

For example, the change execution device 210 is a computer terminal to be operated by a staff member or the like in a place where each facility arranged within the power generation plant is operated so that change content for a facility confirmed by the change content confirmer C (change content of setting conditions of a target facility requested from the service provider S) is applied to (executed in) an actual facility. The change execution device 210 receives the confirmed change information transmitted from the change confirmation device 200 and presents change content of a facility represented by the received confirmed change information to a staff member I who actually operates the facility (hereinafter referred to as a change executor I). Also, when the change executor I inputs information representing the execution of the change content represented by the received confirmed change information, the change execution device 210 transmits information of a change to be executed (a parameter value of the facility) to the plant network device 300 via a circuit of a dedicated communication standard determined with the plant network device 300 (hereinafter referred to as a dedicated communication circuit). Also, in the present disclosure, the communication standard of the dedicated communication circuit determined between the change execution device 210 and the plant network device 300 is not particularly specified.

Also, the change execution device 210 is not an essential component in the remote service system 1. That is, the remote service system 1 may be configured without including the change execution device 210. In this case, in the remote service system 1, the change confirmation device 200 directly transmits information of a change to be executed (a parameter value of the facility) to the plant network device 300. In this case, the plant network device 300 in the remote service system 1 is connected to the network 10.

The plant network device 300 is a computer terminal connected to the entrance of a dedicated communication network (hereinafter referred to as a plant network) constructed within the power generation plant that receives a setting condition change from the remote service system 1. The plant network device 300 transmits information of a change to be executed (a parameter value of the facility) transmitted from the change execution device 210 via the dedicated communication circuit to the plant network. Also, in the present disclosure, a configuration of the plant network device 300 is not particularly specified. For example, the plant network device 300 may be configured as a personal computer connected to a plant network constructed within the power generation plant. Also, for example, the plant network device 300 may be configured as a router device connected to the plant network constructed within the power generation plant. Also, in the present disclosure, the communication standard of the plant network constructed within the power generation plant is not particularly specified.

Also, in the present disclosure, the communication circuit between the change execution device 210 and the plant network device 300 is not limited to the dedicated communication circuit. That is, in the present disclosure, the communication circuit between the change execution device 210 and the plant network device 300 may be a general-purpose communication circuit.

The firewall 310 is a network defense function for securing security in the plant network constructed within the power generation plant. Also, in the present disclosure, a configuration and a method for implementing the function of the firewall 310 are not particularly specified. For example, the firewall 310 may be configured as a router device together with the plant network device 300.

The plant control system 320 is control equipment that controls each facility arranged within the power generation plant. The plant control system 320 sets the parameter value corresponding to the setting condition of the facility changed by the remote service system 1 in the target facility. Also, in the present disclosure, a configuration of the plant control system 320 and a facility control method and a parameter value setting method of the plant control system 320 are not particularly specified.

Thereby, in the power generation plant to which the remote service system 1 is applied, requested change content is applied to the target facility for which the service provider S has requested a setting condition change. More specifically, the plant network device 300 transmits a parameter value of the facility transmitted from the change execution device 210 to the firewall 310, so that the parameter value transmitted from the plant network device 300 is transmitted to the plant control system 320 through the plant network in the power generation plant. In the power generation plant, the plant control system 320 applies the parameter value transmitted from the plant network device 300 via the firewall 310 to the target facility.

Also, in the remote service system 1, a configuration in which the plant control system 320 transmits a result of applying a setting condition of the facility changed by the remote service system 1 to the plant network device 300 via the firewall 310 and the plant network device 300 transmits information of the result of applying the setting condition of the facility to the change execution device 210, the change confirmation device 200, and the change request device 100 may be adopted. In this case, the change execution device 210, the change confirmation device 200, and the change request device 100, i.e., the change executor I, the change content confirmer C, and the service provider S, can confirm whether or not a requested setting condition has been correctly applied to the facility. Thereby, the remote service system 1 having the above configuration can monitor the operation state of the facility. That is, in the remote service system 1 having the above configuration, because a result of applying the setting condition in the plant control system 320 is transmitted to each of the change execution device 210, the change confirmation device 200, and the change request device 100 even if an unrequested setting condition change has been made with respect to the facility, the result can be utilized for monitoring a change in the setting condition of the facility due to user spoofing or change information alteration midway in a path along which the change information is transmitted by a third party.

Figure 2:
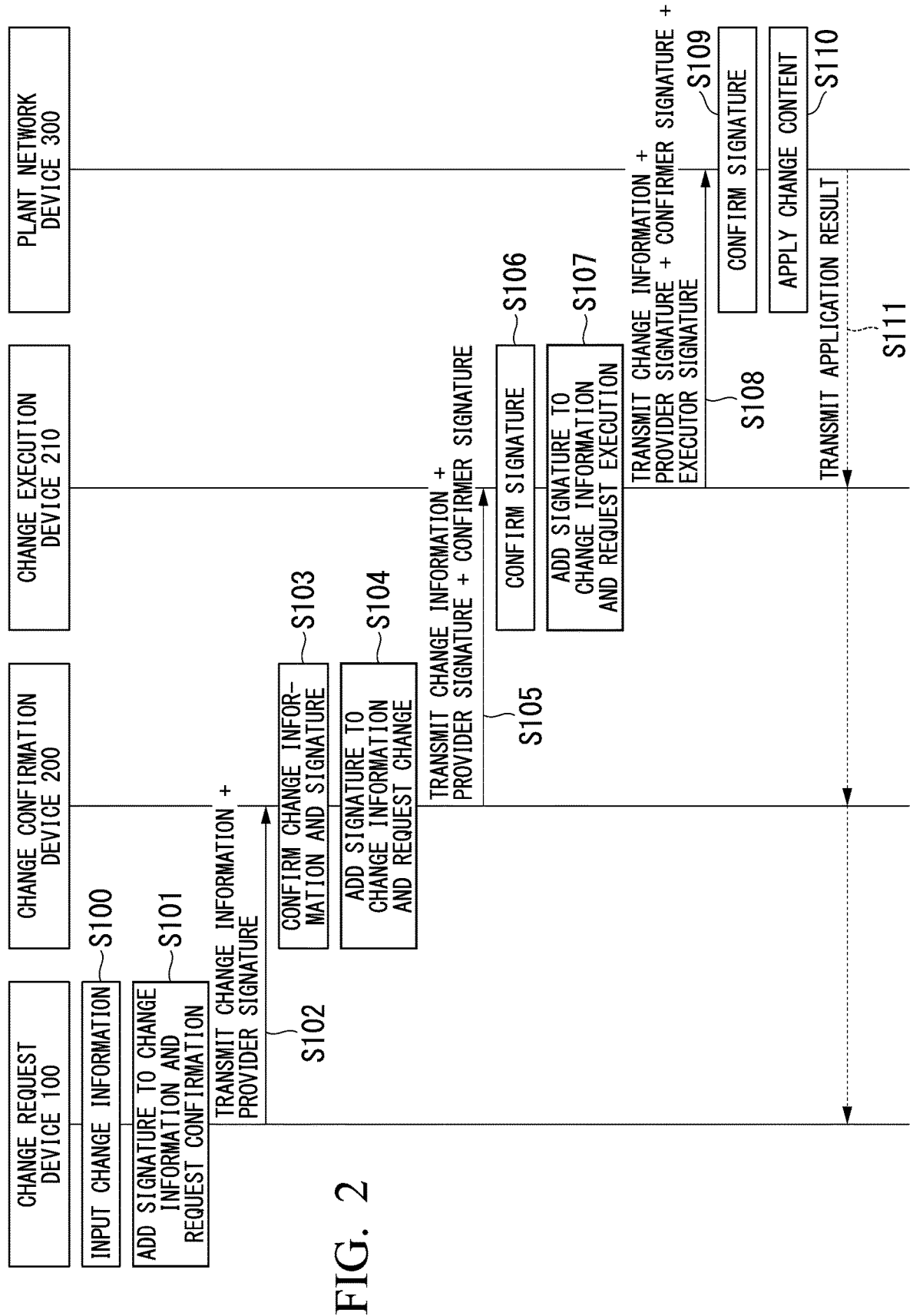
FIG. 2 is a sequence diagram showing a process and work flow in the remote service system of the first embodiment.

Next, a process and work of changing the setting conditions of a facility using the remote service system 1 will be described. FIG. 2 is a sequence diagram showing a process and work flow (a processing sequence) in the remote service system 1 of the first embodiment. In FIG. 2, an example of a flow of a process in each of the change request device 100, the change confirmation device 200, the change execution device 210, and the plant network device 300 connected to the network 10 constituting the remote service system 1 is shown. Also, in FIG. 2, a process of the plant control system 320 that sets the change content from the remote service system 1 in the target facility is shown as a process of the plant network device 300. Also, in FIG. 2, work items of the service provider S, the change content confirmer C, and the change executor I, i.e., operations on the change request device 100, the change confirmation device 200, and the change execution device 210, are shown together with the above process. As described above, in the remote service system 1, each of the change request device 100, the change confirmation device 200, and the change execution device 210 transmits and receives change information via the network 10.

First, the service provider S operates the change request device 100 to input change information including identification information (for example, an equipment ID hereinafter referred to as facility identification information) of a target facility whose setting condition is changed, a parameter value of the facility, and the like to the change request device 100 (step S100).

The service provider S operates the change request device 100 to add a signature. Subsequently, the service provider S instructs the change request device 100 to perform the transmission of the change information input by the service provider S and the signature added by the service provider S (hereinafter referred to as a provider signature (or a first signature)) and requests the change content confirmer C to confirm the change information (step S101).

Thereby, the change request device 100 transmits data of "change information+provider signature" in which the change information input by the service provider S and the provider signature are associated to the change confirmation device 200 via the network 10 (step S102). At this time, the change request device 100 encodes the provider signature using a predetermined key (a public key, a secret key, a common key, or the like) of the service provider S and transmits the data of "change information+provider signature" to the change confirmation device 200.

Subsequently, the change confirmation device 200 presents the change information and the provider signature included in the received data of "change information+provider signature" to the change content confirmer C. At this time, the change confirmation device 200 decodes the provider signature included in the received data of "change information+provider signature" using the key (the public key, the secret key, the common key, or the like) of the service provider S that has been previously obtained and presents the change information and the provider signature to the change content confirmer C together with a result of comparing a hash value of the change information included in the "provider signature" with a hash value of the received "change information." The change content confirmer C confirms the change information and the provider signature presented by the change confirmation device 200 (together with the result of comparing the hash values) (step S103).

When the presented provider signature is a correct signature and the presented change information is correct change content (applicable without any problem) with respect to a target facility for which the service provider S changes the setting condition, the change content confirmer C operates the change confirmation device 200 to add the signature. That is, when the provider signature presented by the change confirmation device 200 is a signature of an official user of the remote service system 1 that can change the setting condition of the facility and the parameter value of the facility represented by the change information presented by the change confirmation device 200 is a parameter value applicable to a facility having facility identification information shown in the change information, the change content confirmer C further adds the signature added by the change content confirmer C (hereinafter referred to as a confirmer signature (or a second signature)) to the change information received by the change confirmation device 200. Subsequently, the change content confirmer C instructs the change confirmation device 200 to transmit the received change information, the provider signature, and the confirmer signature and requests the change executor I to change the setting condition of the facility (step S104).

Thereby, the change confirmation device 200 transmits data of "change information+provider signature+confirmer signature" in which the change information associated with the provider signature received from the change request device 100 via the network 10 is further associated with the confirmer signature to the change execution device 210 via the network 10 (step S105). At this time, the change confirmation device 200 encodes the confirmer signature using a predetermined key (a public key, a secret key, a common key, or the like) of the change content confirmer C and transmits the data of "change information+provider signature+confirmer signature" to the change execution device 210.

Subsequently, the change execution device 210 presents the provider signature and the confirmer signature included in the received data of "change information+provider signature+confirmer signature" to the change executor I. At this time, the change execution device 210 decodes the provider signature included in the received data of "change information+provider signature+confirmer signature" using the key of the service provider S that has been previously obtained and compares the hash value of the change information included in the "provider signature" with the hash value of the "change information." Also, the change execution device 210 decodes the "confirmer signature" using the key (the public key, the secret key, the common key, or the like) of the change content confirmer C that has been previously obtained and compares the hash value of "change information+provider signature" included in the confirmer signature with the hash value of the received "change information+provider signature." The change execution device 210 presents the change information, the provider signature, and the confirmer signature to the change executor I together with a result of comparing the signatures. The change executor I confirms the provider signature and the confirmer signature presented by the change execution device 210 (together with a result of comparing the hash values) (step S106).

When the provider signature and the confirmer signature that have been presented are correct, the change executor I operates the change execution device 210 to add the signatures. That is, when the provider signature and the confirmer signature presented by the change execution device 210 are signatures of official users of the remote service system 1 that can change the setting conditions of the facility, the change executor I further adds the signature of the change executor I (hereinafter referred to as the executor signature (or a third signature)) to the change information received by the change execution device 210. Subsequently, the change executor I instructs the change execution device 210 to transmit the received change information, the provider signature, the confirmer signature, and the executor signature and requests the plant network device 300 to execute a change in the setting condition of the facility (step S107).

Thereby, the change execution device 210 transmits data of "change information+provider signature+confirmer signature+executor signature" in which change information associated with the provider signature and the confirmer signature received from the change confirmation device 200 via the network 10 is further associated with the executor signature to the plant network device 300 via the dedicated communication circuit (step S108).

Thereby, the plant network device 300 confirms the provider signature, the confirmer signature, and the executor signature included in the received data of "change information+provider signature+confirmer signature+executor signature" (step S109).

The plant network device 300 applies change content to a target facility for which the service provider S has requested a setting condition change when the confirmed signatures of the service provider S, the change content confirmer C, and the change executor I are correct and the order in which the signatures are added is correct, i.e., a path along which the change information is transmitted is a correct path (step S110). More specifically, the plant network device 300 transmits a parameter value of a facility shown in the change information to the plant control system 320, which controls the facility having the facility identification information shown in the change information included in the data of "change information+provider signature+confirmer signature+executor signature" transmitted from the change execution device 210, using the plant network via the firewall 310. Thereby, the plant control system 320 changes the parameter value of the facility shown in the change information to the parameter value of the facility shown in the change information and the target facility for which the service provider S has requested a change in the setting condition has a setting condition requested by the service provider S.

Also, when the plant control system 320 is configured to transmit a result of applying the setting condition requested by the service provider S to the target facility (hereinafter referred to as an application result) to the plant network device 300, the plant control system 320 transmits information of the application result to the plant network device 300 via the firewall 310. Thereby, the plant network device 300 transmits the information of the application result transmitted from the plant control system 320 to the change execution device 210. The change execution device 210 transmits the information of the application result transmitted from the plant network device 300 to the change confirmation device 200 and the change request device 100. Also, the plant network device 300 may be configured to transmit the information of the application result transmitted from the plant control system 320 to each of the change execution device 210, the change confirmation device 200, and the change request device 100. Thereby, the change execution device 210, the change confirmation device 200, and the change request device 100, i.e., the change executor I, the change content confirmer C, and the service provider S, can confirm the information of the application result transmitted from the plant control system 320. In FIG. 2, a process of transmitting the information of the application result transmitted from the plant control system 320 to each of the change execution device 210, the change confirmation device 200, and the change request device 100 is represented by a broken line as step S111.

According to the configuration, the process, and the work flow (the processing sequence) as described above, in the remote service system 1, users sequentially add signatures to the change information in steps. That is, the signatures of the users are added in a chain. Change content confirmed by a plurality of users is applied to the facility. Thereby, it is possible to eliminate the conventionally required confirmation of a related department of the power generation plant when a parameter value set in the facility is changed and it is possible to efficiently change a setting condition of the facility. Also, because the plurality of users confirm the change information, it is possible to prevent user spoofing or change information alteration midway in a path along which the change information is transmitted by a third party at a high security level.

Also, in the remote service system 1, the plant network device 300 transmits a parameter value of the facility shown in the change information transmitted along a correct path to the plant network via the firewall 310. Thereby, in the power generation plant, the plant control system 320 applies the parameter value of the facility to the target facility. Thus, even if a part of the change information transmitted by the service provider S using the change request device 100 is changed, the service provider S adds a signature again and the users sequentially adds signatures. Thereby, a user other than the service provider S cannot unilaterally change the change information and the intention of the service provider S can be reflected in the setting condition of the facility.

Also, a case in which each of the service provider S, the change content confirmer C, and the change executor I adds a signature by operating the change request device 100, the change confirmation device 200, or the change execution device 210 corresponding thereto in the processing sequence in the remote service system 1 has been described. However, a method in which each user adds a signature is not limited to a method that is performed by operating the corresponding computer terminal. For example, as described above, a function of each of the change request device 100, the change confirmation device 200, or the change execution device 210 is implemented by executing a program or an application. Thus, the signature addition by the service provider S, the change content confirmer C, and the change executor I may be automated by causing the program or application to execute a function of adding a signature. In this case, for example, automating the addition of the signature for each user, instead of the signature for each computer terminal, using information when the user logs in to the computer terminal is conceivable.

Second Embodiment

Next, a second embodiment will be described. A remote service system of the second embodiment is also a system that remotely changes a setting condition of a facility arranged within a plant such as a power generation plant.

Also, among components of the remote service system of the second embodiment, components similar to those of the remote service system 1 of the first embodiment are denoted by the same reference numerals and the detailed description of the components will be omitted.

Figure 3:
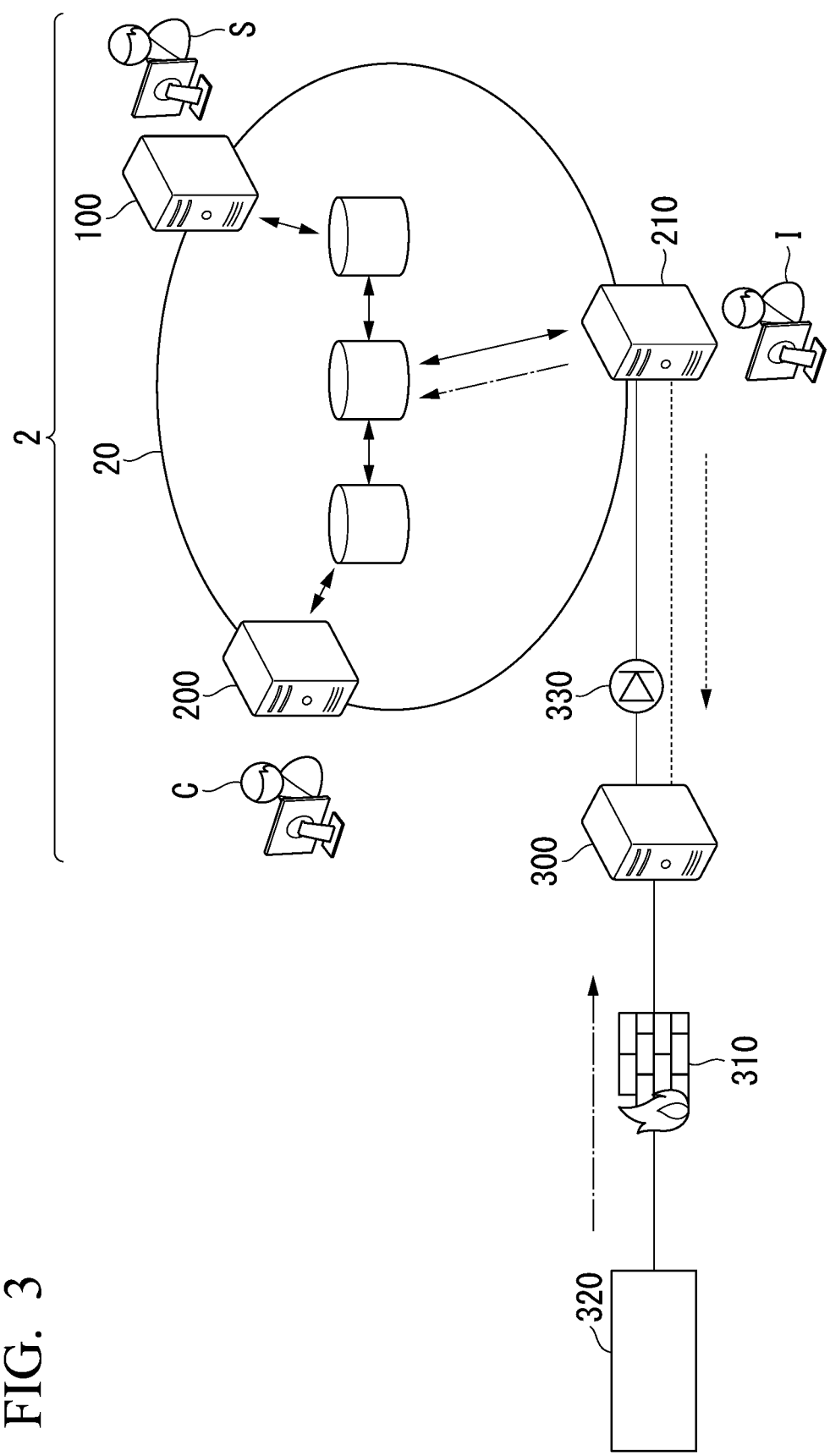
FIG. 3 is a block diagram showing a schematic configuration of a remote service system according to a second embodiment.

FIG. 3 is a block diagram showing a schematic configuration of a remote service system according to the second embodiment. The remote service system 2 is configured to include a change request device 100, a change confirmation device 200, a change execution device 210, and a plant network device 300. In the remote service system 2, the change request device 100, the change confirmation device 200, and the change execution device 210 are connected to a block chain 20. Also, in FIG. 3, as in FIG. 1, a firewall 310 and a plant control system 320, which are components of a power generation plant for which the remote service system 2 requests a setting condition change, are shown together with the above components. Also, in FIG. 3, a data diode 330 is shown as a component of the power generation plant together with the above components.

Also, although a case in which the firewall 310 is located between the plant network device 300 and the plant control system 320 is shown in FIG. 3, the firewall 310 may be located at any position between the change execution device 210 and the plant control system 320 as in FIG. 1. Also, in general, the data diode 330 have a firewall function. Thus, when the data diode 330 has a firewall function, the firewall 310 does not have to be in a path from the change execution device 210 to the plant control system 320.

The block chain 20 is a public or private communication network obtained by constructing a data management system in which distributed data management technology for designating a block of certain data as one block, causing blocks to be connected on the basis of hash values representing data included in the blocks, and managing the blocks is adopted. Because a block of data registered in the block chain 20 is connected in time series with a block of data previously registered on the basis of the hash value, it is possible to manage data together with history information at the time of registration and alteration of data can be made difficult. The block chain 20 is configured to include a plurality of data server devices.

In the block chain 20, it is possible to confirm the validity of data distributed to a plurality of data server devices by consensus building. More specifically, when data registration is requested from any data server device in the block chain 20, each data server device confirms whether or not the data can be registered by confirming a signature added to the data requested to be registered. The requested data is registered when a result of signature confirmation by each data server device represents that a predetermined rule is satisfied in the block chain 20. In this manner, because only data for which a result of signature confirmation by each data server device represents that the predetermined rule is satisfied is registered in the block chain 20, only data whose validity has been confirmed is registered. Here, for example, a rule that confirmation results of half or more or ⅔ or more of all the data server devices match can be provided as the predetermined rule.

A configuration of the block chain 20 including three data server devices is shown in FIG. 3. Thereby, the remote service system 2 can prevent alteration of the data server device by only one organization by distributing management authorities for the data server devices. For example, when authorities for three data server devices are assigned to the service provider S, the change content confirmer C, and the change executor I and there is a rule that new information (a block) cannot be registered in the block chain 20 if data content stored in the data server device does not match data content in two or more data server devices, the service provider S, the change content confirmer C, and the change executor I cannot independently alter the database. In this manner, the remote service system 2 can enhance robustness against alteration of data.

Also, the block chain 20 may include more data server devices. Also, each data server device may be a data server device incorporated in a cloud computing system. Also, in the block chain 20, a data server device in which data of each block is separately recorded (registered) is not predetermined. Accordingly, in the following description, the description will be given under the assumption that the data server device constituting the block chain 20 is not particularly specified and the entire block chain 20 functions as one data server device.

The data diode 330 is a communication network configured to implement only communication in one direction and physically block communication in the other direction. In FIG. 3, a configuration in which only one-way communication from the power generation plant to the outside is performed is shown. More specifically, in FIG. 3, communication via the data diode 330 is physically limited to only one direction from the plant network device 300 to the change execution device 210. Also, the data diode 330 can be provided at a similar position in the power generation plant to which the remote service system 1 of the first embodiment is applied. That is, a function using the data diode 330 to be described below can also be implemented in the power generation plant to which the remote service system 1 of the first embodiment is applied. Also, in the present disclosure, a configuration and a method for implementing the function of the data diode 330 are not particularly specified.

Also, the reason why the data diode 330 is placed in the path from the change execution device 210 to the plant control system 320 is as follows. In important infrastructure such as a power generation plant, a component for performing only one-way communication called the data diode 330 is used so that inbound communication that is access from the outside to a network within the plant is limited to prevent a cyberattack from a malicious third party. Thereby, the non-contact communication in the plant is physically limited to one direction from the plant to the outside, i.e., outbound communication. On the other hand, serial communication and communication of a limited protocol may be performed to perform the minimum inbound communication while preventing a cyberattack. In the present disclosure, a configuration in which this limited communication path is implemented using the data diode 330 is shown.

In the remote service system 2, each of the change request device 100, the change confirmation device 200, and the change execution device 210 logs in to the same communication network system of the block chain 20 and exchanges data of change information in each step via the block chain 20. Also, an operation of each component in the remote service system 2 is similar to that of the remote service system 1, except that the operation for exchanging the data of the change information in each step via the block chain 20 is different.

More specifically, in the remote service system 2, the change request device 100 registers the change information input by the service provider S in the block chain 20 instead of transmitting the change information to the change confirmation device 200 via the network 10. Also, in the remote service system 2, the change confirmation device 200 acquires the change information registered in the block chain 20 by the change request device 100 from the block chain 20 instead of receiving the change information transmitted from the change request device 100 via the network 10. The change confirmation device 200 registers the change information confirmed by the change content confirmer C in the block chain 20 instead of transmitting the change information to the change execution device 210 via the network 10. Also, the change execution device 210 acquires confirmed change information registered in the block chain 20 by the change confirmation device 200 from the block chain 20 instead of receiving the confirmed change information transmitted from the change confirmation device 200 via the network 10. The change execution device 210 transmits the change information (a parameter value of the facility) related to the execution of the change content represented by the confirmed change information by the change executor I to the plant network device 300 via the dedicated communication circuit.

Also, in the remote service system 2, the communication circuit between the change execution device 210 and the plant network device 300 is not limited to a dedicated communication circuit. For example, the communication circuit between the change execution device 210 and the plant network device 300 may be a communication circuit that performs serial communication and communication of a limited protocol. Also, in the present disclosure, a method and a configuration when the communication circuit between the change execution device 210 and the plant network device 300 is implemented by serial communication and communication of a limited protocol are not particularly specified.

Thereby, in the power generation plant to which the remote service system 2 is applied, the requested change content is also applied to a target facility for which the service provider S has requested a setting condition change.

Also, the change execution device 210 in the remote service system 2 is not an essential component. That is, similar to the remote service system 1, the remote service system 2 may also not include the change execution device 210. In this case, in the remote service system 2, the plant network device 300 logs in to the block chain 20 and the change confirmation device 200 acquires the change information (a parameter value of a facility) registered in the block chain 20 from the block chain 20 and directly transmits the change information to the plant network device 300.

Also, in the remote service system 2, the plant control system 320 transmits a result representing an operation state of a facility according to a setting condition of the facility changed by the remote service system 2, i.e., data of a change result that is an application result of applying the change content represented by the change information, to the plant network device 300 via the firewall 310. Thereby, the plant network device 300 transmits the data of the change result transmitted from the plant control system 320 to the change execution device 210 via the data diode 330. In the remote service system 2, the change execution device 210 adds a signature to the data of the change result transmitted from the plant network device 300 via the data diode 330 and registers the data in the block chain 20.

Also, in the remote service system 2, the plant network device 300 may add the signature to the data of the change result. This is because the plant network device 300 is protected from an external network by the data diode 330 and thus is less susceptible to a cyberattack from a malicious third party and the reliability of a secret key retained by the plant network device 300 is high. Also, in the remote service system 2, each of the plant network device 300 and the change execution device 210 may add a signature to the data of the change result.

Thereby, in the power generation plant to which the remote service system 2 is applied, the service provider S can confirm a change result of an operation state in a target facility for which a setting condition change is requested. More specifically, the change request device 100 acquires the data of the change result registered in the block chain 20 by the change execution device 210 from the block chain 20 and presents the data to the service provider S. Also, the change confirmation device 200 can acquire the data of the change result registered by the change execution device 210 in the block chain 20 from the block chain 20. That is, in the power generation plant to which the remote service system 2 is applied, the change content confirmer C can confirm a change result of applying the confirmed change information to the target facility.

Also, the change result includes facility identification information (for example, an equipment ID) of a facility, information representing an operation state, a changed parameter value of the facility, and the like. Also, the change result may include, for example, data for calculating the efficiency of a facility in operation such as a key performance evaluation index (a key performance indicator (KPI)). In this case, the change execution device 210 may calculate the KPI on the basis of the change result transmitted from the plant network device 300 via the data diode 330, add a signature to data of the calculated KPI, and register the data in the block chain 20. Also, the plant network device 300 may be configured to calculate the KPI, further adds a signature representing the plant network device 300 to data of the calculated KPI, designate the data as data of the change result, and directly register the data in the block chain 20 via the data diode 330.

Figure 4:
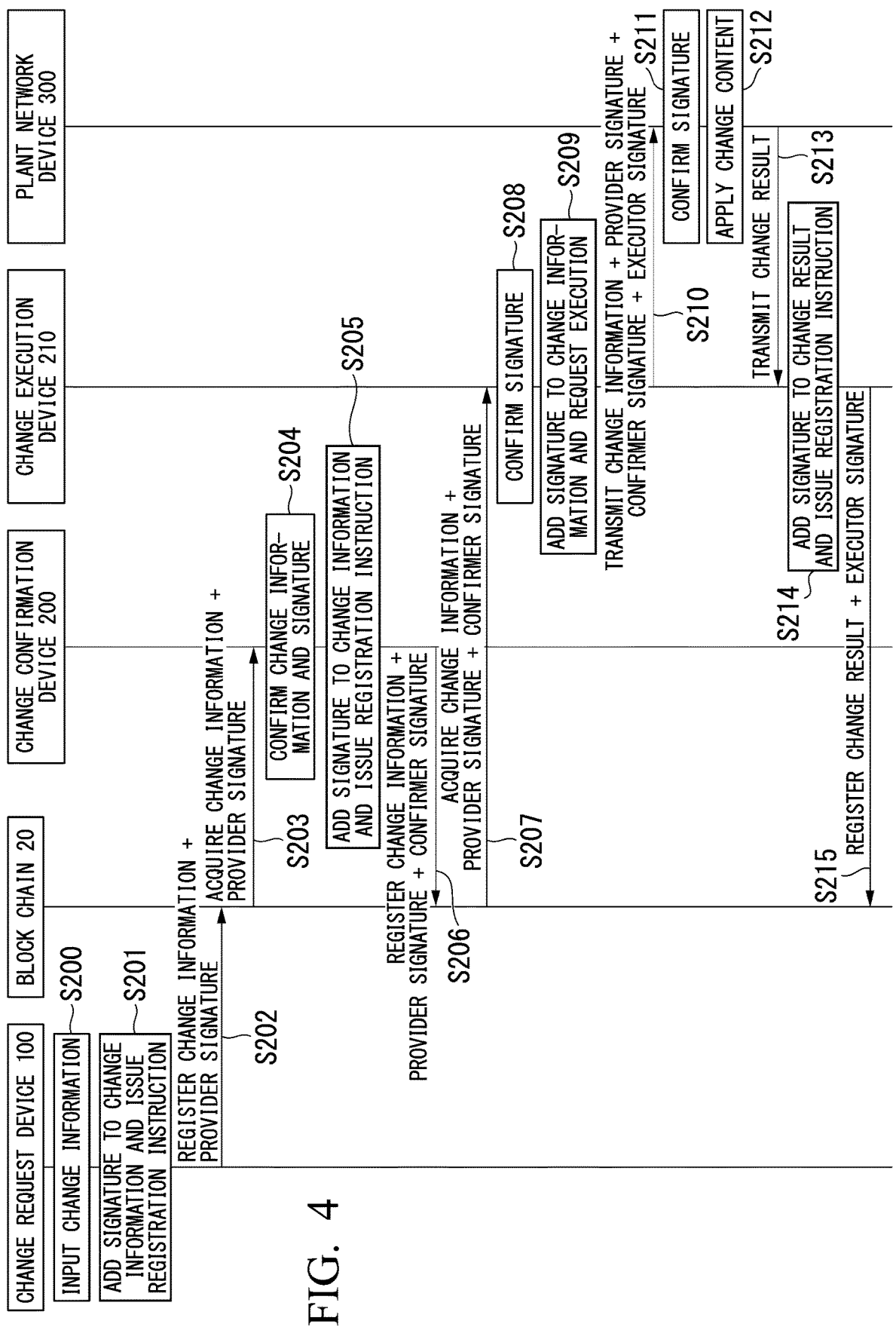
FIG. 4 is a sequence diagram showing a process and work flow in the remote service system of the second embodiment.

Next, a processing sequence for changing the setting conditions of a facility using the remote service system 2 will be described. FIG. 4 is a sequence diagram showing a process and work flow (a processing sequence) in the remote service system 2 of the second embodiment. In FIG. 4, an example of a flow of a process in each of the block chain 20 and the change request device 100, the change confirmation device 200, and the change execution device 210 connected to the block chain 20, and the plant network device 300, which constitute the remote service system 3 is shown. Also, in FIG. 4, as in FIG. 2, a process of the plant control system 320 that sets the change content from the remote service system 2 in the target facility is shown as a process of the plant network device 300. Also, in FIG. 4, work items of the service provider S, the change content confirmer C, and the change executor I (operations on the change request device 100, the change confirmation device 200, and the change execution device 210) are shown together with the above process. As described above, in the remote service system 2, each of the change request device 100, the change confirmation device 200, and the change execution device 210 exchanges change information via the block chain 20.

First, the service provider S operates the change request device 100 to input change information including facility identification information (for example, an equipment ID) of a target facility whose setting condition is changed, a parameter value of the facility, and the like to the change request device 100 (step S200).

The service provider S operates the change request device 100 to add a signature. Subsequently, the service provider S instructs the change request device 100 to register the input change information and a provider signature in the block chain 20 (step S201).

Thereby, the change request device 100 registers data of "change information+provider signature" in which the change information input by the service provider S and the signature added by the service provider S are associated in the block chain 20 (step S202). At this time, the change request device 100 encodes the provider signature using a predetermined key (a public key, a secret key, a common key, or the like) of the service provider S and registers the data of "change information+provider signature" in the block chain 20. Thereby, in the block chain 20, for example, as data of a first block, the facility identification information of the facility and data of a parameter value of the facility included in the data of "change information+provider signature" registered by the change request device 100 is registered as "data content" and identification information of the service provider S (for example, a staff member ID), i.e., information representing a service provider, is registered as "transmitter information" and the provider signature is registered as "signature information."

Subsequently, the change content confirmer C regularly operates the change confirmation device 200 to confirm whether or not the data of "change information+provider signature" has been registered in the block chain 20 by the change request device 100, i.e., whether or not the data of "change information+provider signature" has been updated. When new data of "change information+provider signature" has been registered in the block chain 20 by the change request device 100, the change content confirmer C operates the change confirmation device 200 to acquire the new data of "change information+provider signature" registered in the block chain 20 from the block chain 20 (step S203).

Thereby, the change confirmation device 200 presents the change information and the provider signature included in the acquired data of "change information+provider signature" to the change content confirmer C. At this time, the change confirmation device 200 decodes the provider signature included in the acquired data of "change information+provider signature" using the key (the public key, the secret key, the common key, or the like) of the service provider S that has been previously obtained and presents the change information and the provider signature to the change content confirmer C together with a result of comparing a hash value of the change information included in the "provider signature" with a hash value of the acquired "change information." The change content confirmer C confirms the change information and the provider signature presented by the change confirmation device 200 (together with the result of comparing the hash values) (step S204).

When the presented provider signature is a correct signature and the presented change information is correct change content (applicable without any problem) with respect to a target facility for which the service provider S changes the setting condition, the change content confirmer C operates the change confirmation device 200 to add the signature. That is, when the provider signature presented by the change confirmation device 200 is a signature of an official user of the remote service system 2 that can change the setting condition of the facility and the parameter value of the facility represented by the change information presented by the change confirmation device 200 is a parameter value applicable to a facility having facility identification information shown in the change information, the change content confirmer C further adds the confirmer signature to the change information acquired by the change confirmation device 200. Subsequently, the change content confirmer C instructs the change confirmation device 200 to register the acquired change information, the provider signature, and the confirmer signature in the block chain 20 (step S205).

Thereby, the change confirmation device 200 registers the data of "change information+provider signature+confirmer signature" in which the change information associated with the provider signature acquired from the block chain 20 is further associated with the confirmer signature in the block chain 20 (step S206). At this time, the change confirmation device 200 encodes the signature added by the change content confirmer C using a predetermined key (a public key, a secret key, a common key, or the like) of the change content confirmer C and registers the data of "change information+provider signature+confirmer signature" in the block chain 20. Thereby, in the block chain 20, for example, as data of a second block, the facility identification information of the facility and data of a parameter value of the facility included in the data of "change information+provider signature+confirmer signature" registered by the change confirmation device 200 is registered as "data content" and identification information of the change content confirmer C (for example, a staff member ID), i.e., information representing a change content confirmer, is registered as "transmitter information" and the provider signature and the confirmer signature are registered as "signature information."

Subsequently, the change executor I regularly operates the change execution device 210 to confirm whether or not the data of "change information+provider signature+confirmer signature" has been registered in the block chain 20 by the change confirmation device 200, i.e., whether or not the data of "change information+provider signature+confirmer signature" has been updated. When new data of "change information+provider signature+confirmer signature" has been registered in the block chain 20 by the change confirmation device 200, the change executor I operates the change execution device 210 to acquire the new data of "change information+provider signature+confirmer signature" registered in the block chain 20 from the block chain 20 (step S207).

Thereby, the change execution device 210 presents the provider signature and the confirmer signature included in the acquired data of "change information+provider signature+confirmer signature" to the change executor I. At this time, the change execution device 210 decodes the provider signature included in the acquired data of "change information+provider signature+confirmer signature" using the key of the service provider S that has been previously obtained and compares the hash value of the change information included in the provider signature with the hash value of the acquired change information. Also, the change execution device 210 decodes the confirmer signature included in the acquired data of "change information+provider signature+confirmer signature" using a key (a public key, a secret key, a common key, or the like) of the change content confirmer C that has been previously obtained and compares the hash value of "change information+provider signature" included in the confirmer signature with the hash value of "change information+provider signature" that has been acquired. The change execution device 210 presents the change information, the provider signature, and the confirmer signature to the change executor I together with a result of comparing the signatures. The change executor I confirms the provider signature and the confirmer signature presented by the change execution device 210 (together with a result of comparing the hash values) (step S208).

When the provider signature and the confirmer signature that have been presented are correct, the change executor I operates the change execution device 210 to add the signature. That is, when the provider signature and the confirmer signature presented by the change execution device 210 are signatures of official users of the remote service system 2 that can change the setting condition of the facility, the change executor I further adds the executor signature to the change information acquired by the change execution device 210. Subsequently, the change executor I instructs the change execution device 210 to transmit the acquired change information, the provider signature, the confirmer signature, and the executor signature and requests the plant network device 300 to execute a change in the setting condition of the facility (step S209).

Thereby, the change execution device 210 transmits data of "change information+provider signature+confirmer signature+executor signature" in which change information associated with the provider signature and the confirmer signature registered by the change confirmation device 200 in the block chain 20 is further associated with the executor signature to the plant network device 300 via the dedicated communication circuit (step S210).

Thereby, when the data of "change information+provider signature+confirmer signature+executor signature" transmitted from the change execution device 210 via the dedicated communication circuit is received, the plant network device 300 confirms the provider signature, the confirmer signature, and the executor signature included in the received data of "change information+provider signature+confirmer signature+executor signature" (step S211).

The plant network device 300 applies change content to a target facility for which the service provider S has requested a setting condition change when the confirmed signatures of the service provider S, the change content confirmer C, and the change executor I are correct and the order in which the signatures are added is correct, i.e., a path along which the change information is transmitted is a correct path (step S212). More specifically, the plant network device 300 transmits a parameter value of a facility shown in the change information to the plant control system 320, which controls the facility having the facility identification information shown in the change information included in the data of "change information+provider signature+confirmer signature+executor signature" transmitted from the change execution device 210, using the plant network via the firewall 310. Thereby, the plant control system 320 changes the parameter value of the facility shown in the change information to the parameter value of the facility shown in the change information and the target facility for which the service provider S has requested a setting condition change has a setting condition requested by the service provider S.

Subsequently, the plant control system 320 transmits data of a change result indicating the operation state according to the changed parameter value of the facility to the plant network device 300 via the firewall 310. Thereby, the plant network device 300 transmits the data of the change result transmitted from the plant control system 320 to the change execution device 210 via the data diode 330 (step S213).

Also, the plant network device 300 may add a signature representing the plant control system 320 or the plant network device 300 (hereinafter, referred to as a plant signature) to the data of the change result transmitted from the plant control system 320 and transmit data of "change result+plant signature" to the change execution device 210 via the data diode 330 as the data of the change result transmitted from the plant control system 320. Also, the plant network device 300 may directly register the data of "change result+plant signature" in the block chain 20 via the data diode 330.

Subsequently, the change execution device 210 presents the received data of the change result to the change executor I. The change executor I confirms the data of the change result presented by the change execution device 210, operates the change execution device 210, and adds a signature. Subsequently, the change executor I instructs the change execution device 210 to register the received data of the change result and the signature of the change executor I in the block chain 20 (step S214).

Thereby, the change execution device 210 registers the data of "change result+executor signature" in which the data of the change result transmitted from the plant network device 300 is associated with the signature added by the change executor I in the block chain 20 (step S215). At this time, the change execution device 210 encodes the executor signature using a predetermined key (a public key, a secret key, a common key, or the like) of the change executor I and registers the data of "change result+executor signature" in the block chain 20. Thereby, for example, as the data of the third block the data of the change result included in the data of "change result+executor signature" registered by the change execution device 210 is registered as "data content" in the block chain 20, identification information of the change executor I (for example, a staff member ID), i.e., information representing the change executor is registered as "transmitter information," and the signature of the change executor I is registered as "signature information." Also, the change execution device 210 may add information of a date and time when the plant network device 300 transmitted data of the change result when the data of "change result+executor signature" is registered in the block chain 20.

Thereby, the service provider S can regularly operate the change request device 100 to confirm whether or not the data of "change result+executor signature" has been registered in the block chain 20 by the change execution device 210 and confine a change result of the operation state of the target facility for which the setting condition change has been requested when the data of "change result+executor signature" has been registered. Also, the change content confirmer C can regularly operate the change confirmation device 200 and manage the setting conditions of the facility or the operation state of the facility on the basis of the data of "change result+executor signature" registered in the block chain 20 by the change execution device 210 by confirming whether or not the data registered in the block chain 20 has been updated. At this time, each of the change request device 100 and the change confirmation device 200 decodes the executor signature included in the data of "change result+executor signature" registered in the block chain 20 using a key (a public key, a secret key, a common key, or the like) of the change executor I that has been previously obtained and confirms the change executor I by comparing the hash value of the change result included in the "executor signature" with the hash value of the "change result" acquired from the block chain 20.

According to the configuration, the process, and the work flow (the processing sequence) as described above, in the remote service system 2, users sequentially add signatures to the change information and register the change information in the block chain 20 in steps. That is, the signatures of the users are added to data of the change information registered in the block chain 20 in a chain (time series). Change content confirmed by a plurality of users is applied to the facility. Thereby, it is possible to obtain effects similar to those of the remote service system 1.

Moreover, the remote service system 2 adopts a data management method of making it difficult to alter data and exchanges data of information of each step via the block chain 20 capable of managing a history of registered data in time series. Thereby, the remote service system 2 makes it more difficult to alter each information of the change information, the signature of each of the service provider S, the change content confirmer C, and the change executor I, and the change results included in the data registered in the block chain 20 and can prevent user spoofing or change information alteration by a third party at a higher security level than the remote service system 1.

Modified Examples of Second Embodiment

Next, modified examples of the second embodiment will be described. The modified example of the second embodiment is different from the operation of the remote service system 2 of the second embodiment in that the change execution device 210 constituting the remote service system 2 registers information representing that the plant network device 300 has been requested to make a change in the setting condition of the facility in the block chain 20. Accordingly, in the following description, only the operation of the modified example different from the operation of the remote service system 2 of the second embodiment will be described.

Figure 5:
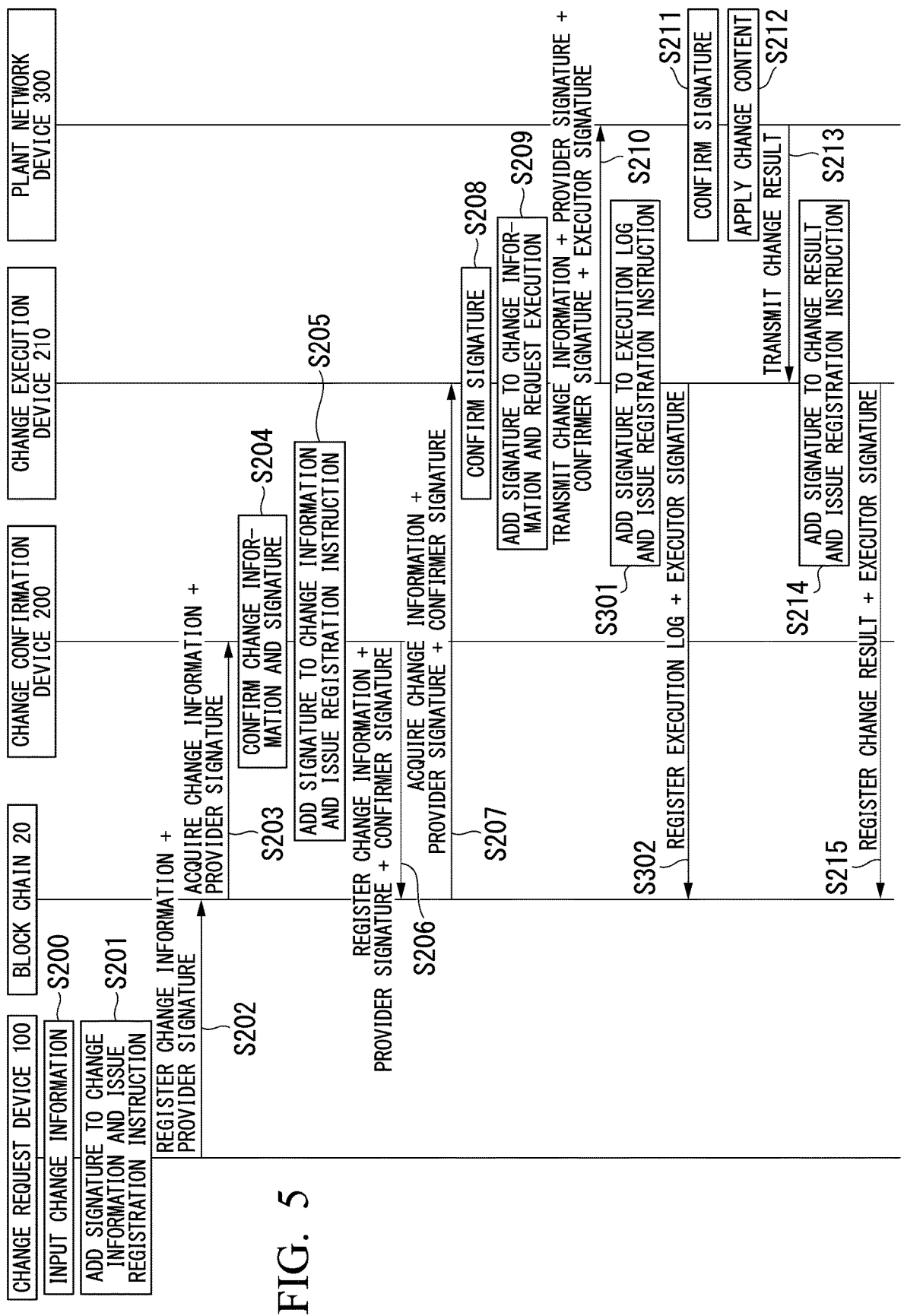
FIG. 5 is a sequence diagram showing a process and work flow in the remote service system according to a modified example of the second embodiment.

FIG. 5 is a sequence diagram showing a process and work flow (a processing sequence) in the remote service system 2 of the modified example of the second embodiment. In FIG. 5, as in FIG. 4, an example of a flow of a process of each of the block chain 20 and the change request device 100, the change confirmation device 200, and the change execution device 210 connected to the block chain 20, and the plant network device 300, which constitute the remote service system 2 is shown. Also, in FIG. 5, as in FIG. 4, a process of the plant control system 320 that sets the change content from the modified example of the remote service system 2 in the target facility is shown as a process of the plant network device 300. Also, work items of the service provider S, the change content confirmer C, and the change executor I are shown in FIG. 5 together with the above process.

As described above, in the modified example of the remote service system 2, the change execution device 210 registers information representing that the plant network device 300 has been requested to make a change in the setting condition of the facility in the block chain 20. Thus, in the sequence diagram of the modified example of the remote service system 2 shown in FIG. 5, a process of the change execution device 210 that registers information representing that the plant network device 300 has been requested to make a change in the setting condition of the facility in the block chain 20 is added. Also, another process and work flow in the modified example of the remote service system 2 are similar to those in the remote service system 2. Accordingly, in FIG. 5, a process and work flow similar to those of the remote service system 2 are denoted by the same step numbers to simplify the description and a different work flow will be mainly described.

In steps S200 to S202, the change request device 100 registers data of "change information+provider signature" in which change information and a provider signature input by the service provider S are associated in the block chain 20. Thereby, for example, data of a first block is registered in the block chain 20.

Subsequently, in steps S203 to S206, the change confirmation device 200 registers data of "change information+provider signature+confirmer signature" in which change information associated with the provider signature acquired from the block chain 20 is further associated with the confirmer signature in the block chain 20. Thereby, for example, data of a second block is registered in the block chain 20.

Subsequently, in steps S207 to S210, the change execution device 210 transmits data of "change information+provider signature+confirmer signature+executor signature" in which the change information associated with the service provider S and the confirmer signature acquired from the block chain 20 is further associated with the executor signature to the plant network device 300 via the dedicated communication circuit.

Subsequently, the change executor I instructs the change execution device 210 to register an execution log for representing that the data of "change information+provider signature+confirmer signature+executor signature" has been transmitted to the plant network device 300 and the executor signature in the block chain 20 (step S301). Also, the execution log includes information and data when data of "change information+provider signature+confirmer signature+executor signature" such as date and time information transmitted to the plant network device 300, change information (facility identification information of a facility and parameter values of the facility), and information of the change executor I has been transmitted to the plant network device 300.

Thereby, the change execution device 210 registers the data of "execution log+executor signature" in which the execution log is associated with the executor signature in the block chain 20 (step S302). At this time, the change execution device 210 encodes the executor signature using a predetermined key (a public key, a secret key, a common key, or the like) of the change executor I and registers data of "execution log+executor signature" in the block chain 20. Thereby, for example, as the data of the third block, date and time information, facility identification information of a facility or data of parameter values of the facility, information of the change executor I, and an executor signature, which are included in the data of "execution log+executor signature" are registered by the change execution device 210 in the block chain 20. The date and time information is registered as a "date and time," the facility identification information of the facility or the data of the parameter values of the facility is registered as "data content," the information of the change executor I is registered as "change executor information," and the executor signature is registered as "signature information."

Thereby, the service provider S can regularly operate the change request device 100 to confirm whether or not the change execution device 210 has registered the data of "execution log+executor signature" in the block chain 20, and confirm that the requested change in the setting condition of the target facility has been executed if the data of "execution log+executor signature" has been registered. Likewise, the change content confirmer C can also regularly operate the change confirmation device 200 to confirm that the confirmed change in the setting condition of the facility has been executed.

On the other hand, in steps S211 to S213, the plant network device 300 and the plant control system 320 change a setting condition of the facility on the basis of data of "change information+provider signature+confirmer signature+executor signature" transmitted by the change execution device 210 via the dedicated communication circuit in step S210 and transmit data of a change result to the change execution device 210 via the data diode 330.

Thereby, in steps S214 and S215, the change execution device 210 registers the data of "change result+executor signature" in which the data of the change result transmitted from the plant network device 300 is associated with the executor signature in the block chain 20. Also, when the data "change result+executor signature" is registered in the block chain 20, the change execution device 210 adds information of a date and time when the plant network device 300 transmitted the data of the change result. Thereby, for example, the data of "change result+executor signature" is registered in the block chain 20 as data of a fourth block.

Thereby, the service provider S can confirm a change result of the operation state of the target facility for which the setting condition change has been requested by regularly operating the change request device 100. Also, the service provider S can confirm a time difference (a delay time period) until the operation state of the facility is actually changed from the time when a requested change in the setting condition of the facility has been executed from a difference between dates and times for the data of "execution log+executor signature" (for example, the data of the third block) and the data of "change result+executor signature" (for example, the data of the fourth block) registered in the block chain 20. Also, the change content confirmer C can regularly operate the change confirmation device 200 to manage the setting conditions of the facility and the operation state of the facility by confirming the data registered in the block chain 20. At this time, each of the change request device 100 and the change confirmation device 200 confirms the change executor I on the basis of the executor signature included in the data of "execution log+executor signature"

registered in the block chain 20 as in a case in which the change executor I is confirmed on the basis of the executor signature included in the data of "change result+executor signature." More specifically, each of the change request device 100 and the change confirmation device 200 decodes the executor signature included in the data of the "execution log+executor signature" registered in the block chain 20 using a key (a public key, a secret key, a common key, or the like) of the change executor I that has been previously obtained and confirms the change executor I by comparing a hash value of the execution log included in the "executor signature" with a hash value of the "execution log" acquired from the block chain 20.

According to such a processing sequence, in the modified example of the remote service system 2, the change execution device 210 also registers an execution log representing that the data of "change information+provider signature+confirmer signature+executor signature" has been transmitted to the plant network device 300 in the block chain 20. That is, in the modified example of the remote service system 2, the execution log whose alteration is difficult is also registered as data of the block chain 20. Thereby, in the modified example of the remote service system 2, it is possible to change or manage setting conditions of the facility together with a progress state of each process and a delay time period of the process and it is possible to prevent user spoofing or alteration of information about a change in the setting condition of the facility including an execution log by a third party at a high security level.

Also, in the remote service system 2 (a modified example of the remote service system 2 in the second embodiment is also included and the same applies when the second embodiment or the remote service system 2 is referred to in the following description), as in the remote service system 1 of the first embodiment, the plant network device 300 transmits a parameter value of the facility shown in the change information to which a signature is added by each user to the plant network via the firewall 310. Thereby, in the power generation plant, the plant control system 320 also applies the parameter value of the facility to the target facility. Thus, even if the service provider S changes a part of the change information registered in the block chain 20 by the change request device 100 in the remote service system 2, the service provider S again adds a signature and registers the signature in the block chain 20 and users confirm change information registered in the block chain 20 and sequentially add signatures. Thereby, a user other than the service provider S cannot unilaterally change the change information and the intention of the service provider S can be reflected in the setting condition of the facility.

Also, in the remote service system 2, a method in which each user adds a signature is not limited to a method to be performed by operating a corresponding computer terminal and signature addition may be automated by executing a program or an application.

Third Embodiment

Next, a third embodiment will be described. A remote service system of the third embodiment is also a system for changing a setting condition of a facility arranged within a plant such as a power generation plant from a remote place, as in the above-described embodiments.

Also, in components of the remote service system of the third embodiment, components similar to those of the remote service system 2 are denoted by the same reference signs and the detailed description of the components will be omitted.

Figure 6:
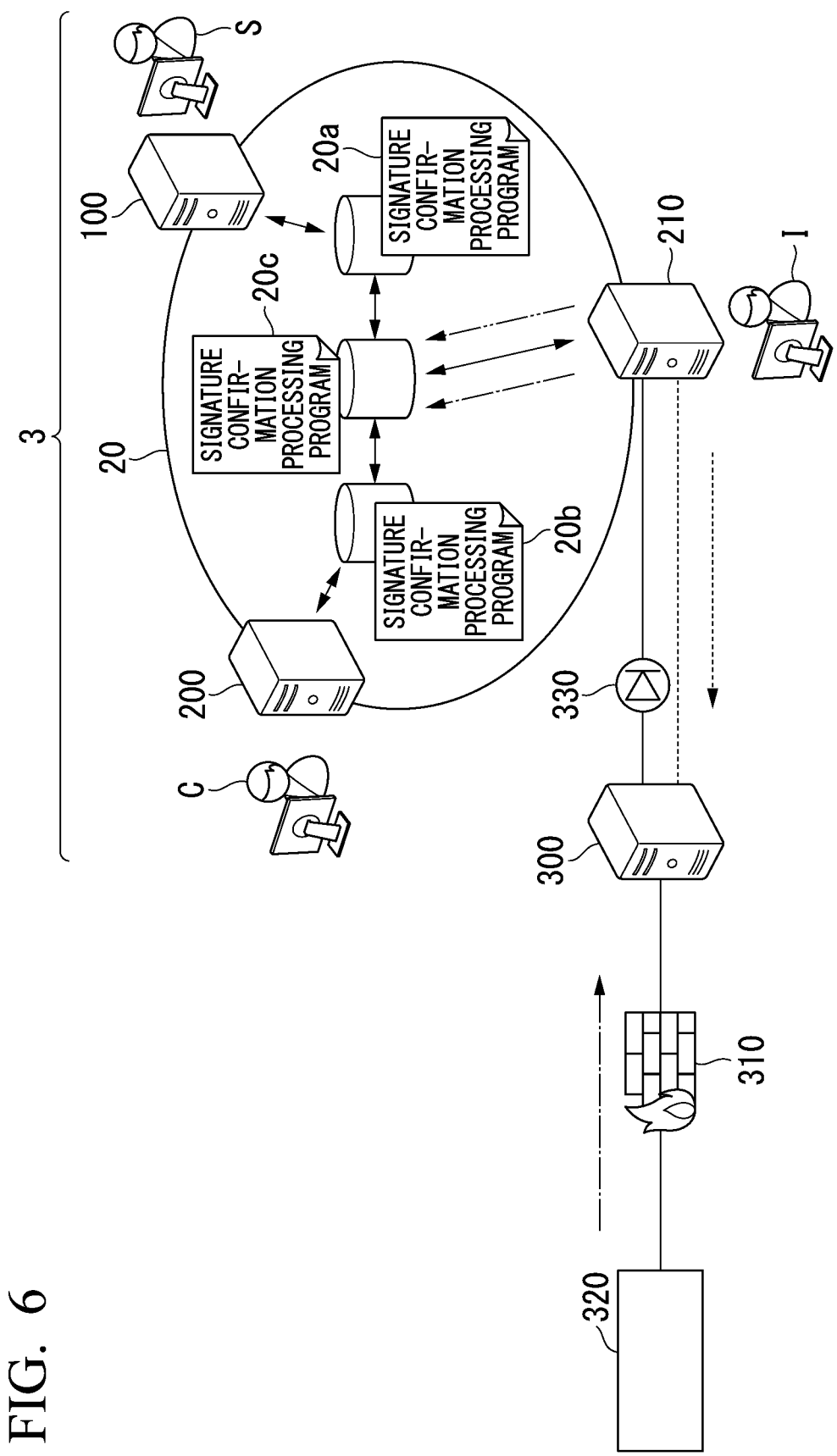
FIG. 6 is a block diagram showing a schematic configuration of a remote service system according to a third embodiment.

FIG. 6 is a block diagram showing a schematic configuration of a remote service system according to the third embodiment. The remote service system 3 is configured to include a change request device 100, a change confirmation device 200, a change execution device 210, and a plant network device 300. In the remote service system 3, each of the change request device 100, the change confirmation device 200, and the change execution device 210 is connected to the block chain 20. In FIG. 6, as in FIG. 3, a firewall 310, a plant control system 320, and a data diode 330 that are components of a power generation plant for which the remote service system 3 request a setting condition change are shown together with the above components. Also, in FIG. 6, a state in which an execution log representing that the change execution device 210 has requested the plant network device 300 to change a setting condition of the facility is registered in the block chain 20 is shown together with the above components.

Also, although a case in which the firewall 310 and the data diode 330 are included in a path from the change execution device 210 to the plant control system 320 is shown in FIG. 6 as in FIG. 3, the firewall 310 may not be included in the path from the change execution device 210 to the plant control system 320 when a firewall function is provided in the data diode 330.

Also, in each embodiment described above, each of the change request device 100, the change confirmation device 200, and the change execution device 210 confirms a signature of each user that has registered data in the block chain 20 by comparing hash values of data using a key (a public key, a secret key, a common key, or the like) of the user that has been previously obtained.

On the other hand, in the remote service system 3, a program for automatedly executing the process of confirming the user's signature (hereinafter referred to as a signature confirmation processing program) is registered in the block chain 20 in advance. Also, the signature confirmation processing program is referred to as a smart contract code or simply a smart contract. In the following description, the signature confirmation processing program will be described as a "smart contract code." That is, in the signature confirmation processing program registered in the block chain 20, as in the data, data of a related program is connected on the basis of the hash value. Thus, the confirmation processing program registered in the block chain 20 can also make alteration difficult and can prevent an unauthorized process from being executed. That is, the signature confirmation processing program can prevent, for example, a third party's signature from being confirmed to be a correct signature of a user. The signature confirmation processing program is automatedly executed using the function of the smart contract code that can be used in the block chain 20 and the signature of each user is confirmed within the block chain 20. In FIG. 6, a state in which a signature confirmation processing program (signature confirmation processing programs 20a to 20c) is registered in each of three data server devices constituting the block chain 20 is shown.

Also, the signature confirmation processing program registered in each server device that constitutes the block chain 20 is not limited to only one program and a plurality of signature confirmation processing programs may be registered. Also, which one of the data server devices constituting the block chain 20 in which the signature confirmation processing program is separately recorded (registered) is not previously determined. Accordingly, in the following description, the description will be given under the assumption that the data server device constituting the block chain 20 in which the signature confirmation processing program is registered is not particularly specified and the signature confirmation processing program is registered in the entire block chain 20.

The signature confirmation processing program is automatedly executed by each user designating a signature confirmation processing program for confirming his/her signature when data is registered in the block chain 20. Here, for example, the designation of the signature confirmation processing program can be performed by registering data having a signature of a user who has set information for identifying the signature confirmation processing program, an address of a storage area in the data server device in which the signature confirmation processing program is registered, block information, and the like in the block chain 20, i.e., by transmitting the data to the block chain 20. When the signature confirmation processing program is executed, a comparison of the hash value of the data desired to be registered is performed using a key (a public key, a secret key, a common key, or the like) of the user that has been previously obtained and it is confirmed whether or not the signature of the data is a correct user signature. The signature confirmation processing program registers the data desired to be registered only when it is confirmed that the signature of the data is a correct user signature. More specifically, the signature confirmation processing program registers data desired to be registered, for example, only when a predetermined rule that half or more of the data server devices must confirm that the signature of the data is the correct user signature is satisfied after the signature of the data desired to be registered is confirmed by each data server device. That is, in the remote service system 3, only data to which the correct user signature is added is registered in the block chain 20.

Thus, the data acquired from the block chain 20 by each user using the remote service system 3 has been already determined to be data registered by the correct user. Accordingly, each of the change request device 100, the change confirmation device 200, and the change execution device 210 constituting the remote service system 3 does not need to perform a comparison of the hash value of the user's signature included in the data as in each embodiment described above when data has been acquired from the block chain 20 in accordance with the operation of the corresponding user. Thus, each user of the remote service system 3 also does not need to confirm the signature of the data. That is, the remote service system 3 does not need to have the public key of another user so that the signature of the user included in the data is confirmed and does not need to manage the public key.

Also, an operation of each of the change request device 100, the change confirmation device 200, and the change execution device 210 in the remote service system 3 is similar to an operation in the remote service system 2 of the second embodiment, except that a corresponding signature confirmation processing program is designated and executed when data of each step (change information, an execution log, or data of a change result) is registered in the block chain 20.

More specifically, when the change request device 100 registers the change information input by the service provider S in the block chain 20 in the remote service system 3, a signature confirmation processing program for performing a process of confirming the provider signature (for example, the signature confirmation processing program 20*a*) is executed. Thereby, the block chain 20 registers only data of the change information to which the correct signature of the service provider S is added. Also, when the change confirmation device 200 registers the change information confirmed by the change content confirmer C in the block chain 20, a signature confirmation processing program for performing a process of confirming the provider signature and the confirmer signature (for example, the signature confirmation processing program 20*b*) is executed. Thereby, the block chain 20 registers only data of confirmed change information in which the correct signatures of the service provider S and the change content confirmer C are added. Also, when the change execution device 210 registers the execution log or the change result data transmitted from the plant network device 300 in the block chain 20, a signature confirmation processing program for performing a process of confirming the executor signature (for example, the signature confirmation processing program 20*c*) is executed. Thereby, the block chain 20 registers only the execution log or the change result data to which the correct signature of the change executor I is added.

Thereby, in the power generation plant to which the remote service system 3 is applied, requested change content is also applied to a target facility for which the service provider S has requested a setting condition change. As in the remote service system 2, the service provider S can confirm the change result of the operation state of the requested target facility and the change content confirmer C can confirm the change result by applying the confirmed change information to the target facility. Also, as in the modified example of the remote service system 2, the service provider S or the change content confirmer C can confirm the execution log in which the change execution device 210 has requested the plant network device 300 to change the facility setting condition. Moreover, because each of the change request device 100, the change confirmation device 200, and the change execution device 210 does not need to perform a process of confirming a signature included in data acquired from the block chain 20, the data is managed by the block chain 20, and it is guaranteed that data has not been altered, it is possible to verify a correct change request and therefore it is possible to change a setting of the facility from a remote place.

Also, the change execution device 210 is not an essential component in the remote service system 3. That is, similar to the remote service system 2, the remote service system 3 may be configured without including the change execution device 210. In this case, in the remote service system 3, when the plant network device 300 registers the execution log and the data of the change result in the block chain 20, a signature confirmation processing program for performing a process of confirming the executor signature (for example, the signature confirmation processing program 20*c*) is executed.

Figure 7:
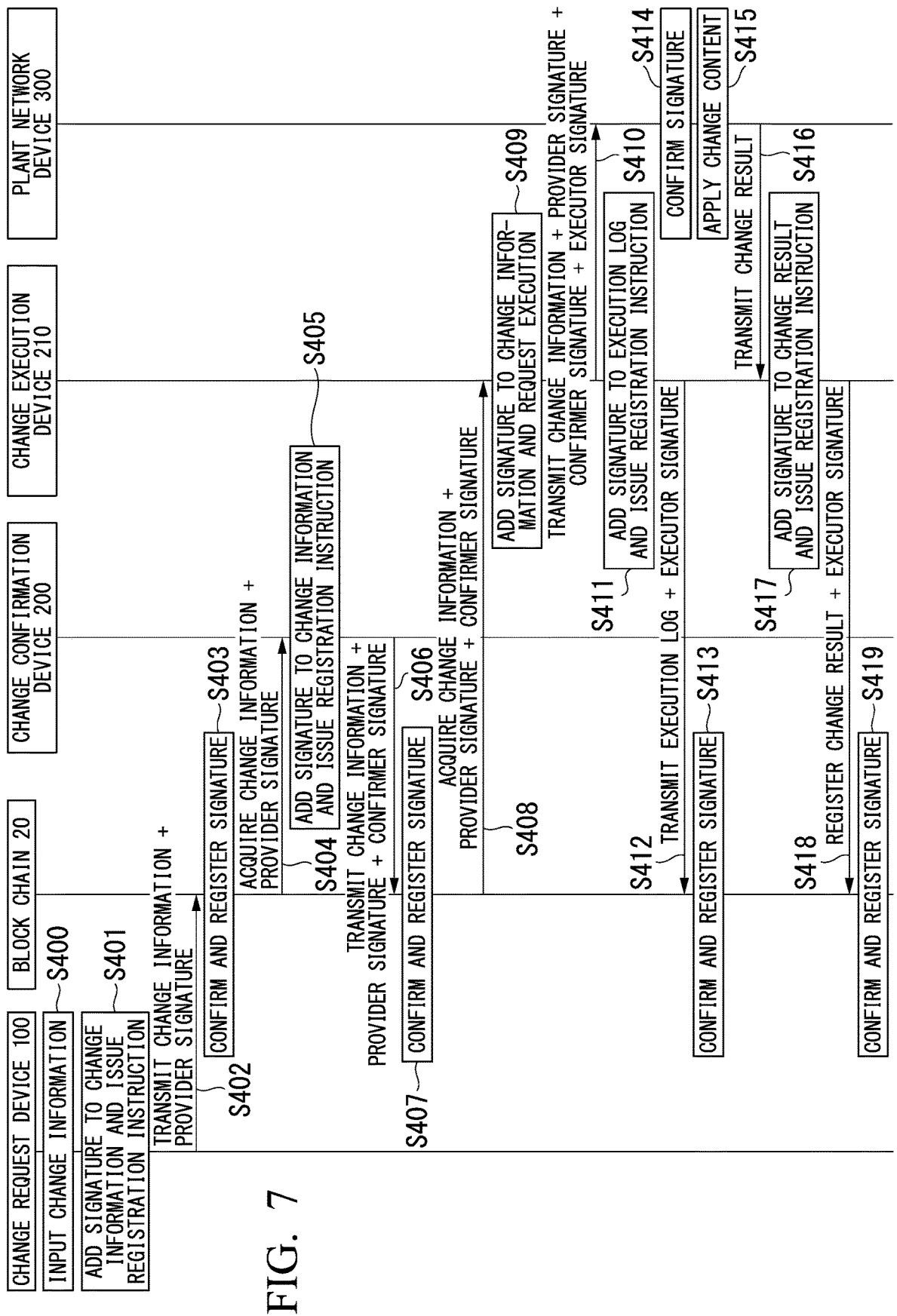
FIG. 7 is a sequence diagram showing a process and work flow in the remote service system of the third embodiment.

Next, the processing sequence for changing the setting conditions of the facility using the remote service system 3 will be described. FIG. 7 is a sequence diagram showing a processing sequence in the remote service system 3 according to the third embodiment. Also, similar to FIG. 5, FIG. 7 is a sequence diagram when the change execution device 210 registers the execution log in the block chain 20. In FIG. 7, an example of a flow of a process of each of the block chain 20 and the change request device 100, the change confirmation device 200, and the change execution device 210 connected to the block chain 20, and the plant network device 300, which constitute the remote service system 2 is shown. Also, in FIG. 7, a process of the plant control system 320 that sets the change content from the remote service system 3 in the target facility is shown as a process of the plant network device 300. Also, work items of the service provider S, the change content confirmer C, and the change executor I are shown together in FIG. 7.

As described above, in the remote service system 3, the user's signature included in the data desired to be registered by each of the change request device 100, the change confirmation device 200, and the change execution device 210 is registered after the user's signature is confirmed by a corresponding signature confirmation processing program registered in the block chain 20. Also, in the remote service system 3, the signature of each user is encoded using a predetermined user key (a public key, a secret key, a common key, or the like) and added to data, decoded using the key (the public key, the secret key, the common key, or the like) of the user that has been previously obtained, and confirmed. However, in the following description, the description of content of a process of encoding and decoding the signature of the user will be omitted and the description will simply be given of "adding" or "confirming" the signature.

Also, the description will be given under the assumption that the signature confirmation processing program 20a shown in the data server device constituting the block chain 20 is a signature confirmation processing program for performing a process of confirming the provider signature, the signature confirmation processing program 20b is a signature confirmation processing program for performing a process of confirming the provider signature and confirmer signature, and the signature confirmation processing program 20c is a signature confirmation processing program for performing a process of confirming the executor signature in FIG. 6.

First, the service provider S operates the change request device 100 to input change information including facility identification information (for example, an equipment ID) of a target facility whose setting condition is changed, a parameter value of the facility, and the like to the change request device 100 (step S400).

The service provider S operates the change request device 100 to add a signature. Subsequently, the service provider S designates the signature confirmation processing program 20a and instructs the change request device 100 to register the change information and the provider signature that have been input in the block chain 20 (step S401).

Thereby, the change request device 100 transmits data of "change information+provider signature" in which the change information input by the service provider S and the signature added by the service provider S are associated and identification information for designating the signature confirmation processing program 20a (hereinafter referred to as program identification information such as an address) to the block chain 20 (step S402).

Subsequently, the block chain 20 executes the signature confirmation processing program 20a indicated by the received program identification information. The block chain 20 confirms the provider signature included in the received data of "change information+provider signature" through the signature confirmation processing program 20a. In the block chain 20, the signature confirmation processing program 20a registers the received data of "change information+provider signature", for example, when half or more of the data server devices confirm that the provider signature confirmed by the data server devices is a correct provider signature (step S403). Thereby, in the block chain 20, the received data of "change information+provider signature" is registered, for example, as data of a first block.

Subsequently, the change content confirmer C regularly operates the change confirmation device 200 to confirm whether or not the data of "change information+provider signature" including the correct provider signature has been registered in the block chain 20, i.e., to confirm whether or not the data of "change information+provider signature" has been updated. When new data of "change information+provider signature" has been registered in the block chain 20 by the change request device 100, the change content confirmer C operates the change confirmation device 200 to acquire new data of "change information+provider signature" registered in the block chain 20 from the block chain 20 (step S404).

Thereby, the change confirmation device 200 presents the change information included in the acquired data of "change information+provider signature" to the change content confirmer C. At this time, the change confirmation device 200 does not decode the provider signature included in the acquired data of "change information+provider signature" and does not present a result of comparing hash values to the change content confirmer C. This is because the data of "change information+provider signature" registered in the block chain 20 has already been determined to be data registered by the correct service provider S as described above.

When the presented change information is correct change content (applicable without any problem) with respect to a target facility for which the service provider S changes the setting condition, the change content confirmer C operates the change confirmation device 200 to further add the confirmer signature to the data of "change information+provider signature". Subsequently, the change content confirmer C designates the signature confirmation processing program 20b for performing a process of confirming the provider signature and the confirmer signature and instructs the block chain 20 to register the acquired change information and provider signature and the confirmer signature in the block chain 20 (step S405).

Thereby, the change confirmation device 200 transmits data of "change information+provider signature+confirmer signature" in which the change information associated with the provider signature acquired from the block chain 20 is further associated with the confirmer signature and the program identification information for designating the signature confirmation processing program 20b to the block chain 20 (step S406).

Subsequently, the block chain 20 activates the signature confirmation processing program 20b indicated by the received program identification information. The block chain 20 confirms the provider signature and the confirmer signature included in the received data of "change information+provider signature+confirmer signature" through the signature confirmation processing program 20b. In the block chain 20, the signature confirmation processing program 20b registers the received data of "change information+provider signature+confirmer signature", for example, when half or more of the data server devices confirm that the provider signature and the confirmer signature confirmed by the data server devices are a correct provider signature and a correct confirmer signature (step S407). Thereby, the received data of "change information+provider signature+confirmer signature" is registered in the block chain 20, for example, as data of a second block.

Subsequently, the change executor I regularly operates the change execution device 210 to confirm whether or not data of "change information+provider signature+confirmer signature" including the correct provider signature and the correct confirmer signature has been registered in the block chain 20, i.e., whether or not the data of "change information+provider signature+confirmer signature" has been updated. When new data of "change information+provider signature+confirmer signature" has been registered in the block chain 20 by the change confirmation device 200, the change executor I operates the change execution device 210 to acquire the new data of "change information+provider signature+confirmer signature" registered in the block chain 20 from the block chain 20 (step S408).

Thereby, the change execution device 210 presents the change information included in the acquired data of "change information+provider signature+confirmer signature" to the change executor I. At this time, the change execution device 210 does not decode the provider signature and the confirmer signature included in the acquired data of "change information+provider signature+confirmer signature", and does not present a result of comparing the hash values to the change executor I. This is because the data of "change information+provider signature+confirmer signature" registered in the block chain 20 has also already been determined to be data confirmed and registered by the correct change content confirmer C as described above.

The change executor I operates the change execution device 210 to further add the executor signature to the data of "change information+provider signature+confirmer signature." Subsequently, the change executor I instructs the change execution device 210 to transmit the change information, the provider signature, the confirmer signature, and the executor signature that have been acquired and requests the plant network device 300 to change a setting condition of a facility (step S409).

Thereby, the change execution device 210 transmits data of "change information+provider signature+confirmer signature+executor signature" in which the change information associated with the provider signature and the confirmer signature acquired from the block chain 20 is further associated with the executor signature to the plant network device 300 via the dedicated communication circuit (step S410).

Also, in the remote service system 3, the communication circuit between the change execution device 210 and the plant network device 300 is not limited to a dedicated communication circuit.

The change executor I operates the change execution device 210 to add a signature to an execution log representing that the data of "change information+provider signature+confirmer signature+executor signature" has been transmitted to the plant network device 300. Subsequently, the change executor I designates the signature confirmation processing program 20*c* for performing the process of confirming the executor signature and instructs the change execution device 210 to register the execution log and the executor signature in the block chain 20 (step S411).

Thereby, the change execution device 210 transmits the data of "execution log+executor signature" in which the execution log is associated with the executor signature and the program identification information for designating the signature confirmation processing program 20*c* to the block chain 20 (step S412).

Subsequently, when the block chain 20 receives the data of "execution log+executor signature" and the program identification information transmitted from the change execution device 210, the signature confirmation processing program 20*c* indicated by the received program identification information is activated (executed). The block chain 20 confirms the executor signature included in the received data of "execution log+executor signature" through the signature confirmation processing program 20*c*. In the block chain 20, the signature confirmation processing program 20*c* registers the received data of "execution log+executor signature", for example, when half or more of the data server devices confirm that the confirmer signature confirmed by the data server devices is a correct confirmer signature (step S413). Thereby, the received data of "execution log+executor signature" is registered in the block chain 20, for example, as data of a third block.

Thereby, the service provider S can regularly operate the change request device 100 to confirm whether or not the data of "execution log+executor signature" has been registered in the block chain 20 by the change execution device 210 and confirm that a requested change in a setting condition in the target facility has been executed if the data of "execution log+executor signature" has been registered. Likewise, the change content confirmer C can also confirm that a confirmed change in a setting condition of the facility has been executed by regularly operating the change confirmation device 200. At this time, the change request device 100 and the change confirmation device 200 present the executor log included in the acquired data of "execution log+executor signature" to the service provider S and the change content confirmer C without decoding the executor signature included in the acquired data of "execution log+executor signature." This is because the data of "execution log+executor signature" registered in the block chain 20 has also already been determined to be data registered by the correct change executor I as described above.

On the other hand, the plant network device 300 confirms the provider signature, the confirmer signature, and the executor signature included in the received data of "change information+provider signature+confirmer signature+executor signature" (step S414).

When the confirmed signatures of the service provider S, the change content confirmer C, and the change executor I are correct, and the order in which the signatures are added is correct, i.e., a path along which the change information has been transmitted is a correct path, the plant network device 300 applies change content to a target facility for which the service provider S has requested the setting condition change (step S415). More specifically, the plant network device 300 transmits a parameter value of a facility shown in the change information to the plant control system 320, which controls the facility having the facility identification information shown in the change information included in the data of "change information+provider signature+confirmer signature+executor signature" transmitted from the change execution device 210, using the plant network via the firewall 310. Thereby, the plant control system 320 changes the parameter value of the facility shown in the change information to the parameter value of the facility shown in the change information and a setting condition of a target facility for which the service provider S has requested a setting condition change becomes a setting condition requested by the service provider S.

Subsequently, the plant control system 320 transmits data of the change result representing the operation state according to the changed parameter value of the facility to the plant network device 300 via the firewall 310. Thereby, the plant network device 300 transmits the data of the change result transmitted from the plant control system 320 to the change execution device 210 via the data diode 330 (step S416). Also, the plant network device 300 may add a plant signature representing the plant control system 320 or the plant network device 300 to the data of the change result transmitted from the plant control system 320 and transmit data of "change result+plant signature" as data of the change result transmitted from the plant control system 320 to the change execution device 210 via the data diode 330.

Subsequently, the change execution device 210 presents the received data of the change result to the change executor I. The change executor I confirms the data of the change result presented by the change execution device 210, operates the change execution device 210, and adds a signature. Subsequently, the change executor I designates the signature confirmation processing program 20*c* and instructs the change execution device 210 to register the received data of the change result and the executor signature in the block chain 20 (step S417).

Thereby, the change execution device 210 transmits the data of "change result+executor signature" in which the data of the change result transmitted from the plant network device 300 is associated with the executor signature and the program identification information for designating the signature confirmation processing program 20*c* to the block chain 20 (step S418). Also, the change execution device 210 may transmit the data of "change result+executor signature" to which information of a date and time when the plant network device 300 transmitted the data of the change result is added and the program identification information to the block chain 20.

Subsequently, the block chain 20 activates the signature confirmation processing program 20*c* indicated by the received program identification information. The block chain 20 confirms the executor signature included in the received data of "change result+executor signature" through the signature confirmation processing program 20*c*. The signature confirmation processing program 20*c* registers the received data of "change result+executor signature", for example, when half or more of the data server devices confirm that the executor signature confirmed by each data server device is a correct executor signature in the block chain 20 (step S419). Thereby, the received data of "change result+executor signature" is registered in the block chain 20, for example, as data of a fifth block.

Also, the plant network device 300 may add a plant signature representing the plant control system 320 or the plant network device 300 to the data of the change result transmitted from the plant control system 320 and directly transmit the data of "change result+plant signature" as data of a change result transmitted from the plant control system 320 to the block chain 20 via the data diode 330 together with program identification information for designating a signature confirmation processing program (not shown) for confirming the plant signature. In this case, the block chain 20 activates the signature confirmation processing program (not shown) indicated by the program identification information transmitted together with the data of "change result+ plant signature" from the plant network device 300 and confirms a signature that is the plant signature included in the data of "change result+plant signature." In the block chain 20, the signature confirmation processing program (not shown) registers the received data of "change result+ plant signature," as data of a fourth block, for example, when half or more of the data server devices confirm that the plant signature confirmed by each data server device is a correct plant signature (the signature of the plant control system 320 or the plant network device 300).

Thereby, the service provider S can regularly operate the change request device 100 to confirm whether or not data of "change result+executor signature" has been registered in the block chain 20 by the change execution device 210 and confirm a change result of an operation state in a target facility for which a setting condition change has been requested if the data of "change result+executor signature" has been registered. Also, the change content confirmer C can regularly operate the change confirmation device 200 to manage the setting conditions of the facility and the operation state of the facility on the basis of the data of "change result+executor signature" registered in the block chain 20 by the change execution device 210 by confirming whether or not the data registered in the block chain 20 has been updated. At this time, the change request device 100 and the change confirmation device 200 present a change result included in the acquired data of "change result+executor signature" to the service provider S and the change content confirmer C without decoding the executor signature included in the acquired data of "change result+executor signature." This is because the data of "change result+ executor signature" registered in the block chain 20 has already been determined to be data registered by the correct change executor I as described above.

According to the configuration, the process, and the work flow (the processing sequence) as described above, in the remote service system 3, each user adds a signature to data (change information, an execution log, or a change result) in a step and designates a signature confirmation processing program for confirming his or her own signature to transmit the designated signature confirmation processing program to the block chain 20 when the data is registered in the block chain 20. Thereby, in the block chain 20, the designated signature confirmation processing program is automatedly executed and the transmitted data is registered in the block chain 20 only when the signature of the correct user is confirmed on the basis of a predetermined rule. Thereby, the data in which the signatures of the correct users are added in a chain (time series) is registered in the block chain 20. As in each embodiment described above, change content confirmed by a plurality of users can be applied to the facility and similar effects can be obtained.

Moreover, in the remote service system 3, a signature confirmation processing program for confirming the user's signature is registered in the block chain 20 in advance. Thereby, the remote service system 3 can prevent alteration of the signature confirmation processing program registered in the block chain 20 at a high security level.

Also, in the remote service system 3, the signature confirmation processing program registered in the block chain 20 confirms the user's signature included in data within the block chain 20. Only the data for which it is determined that the correct user's signature is added is registered in the block chain 20. Thereby, each of the change request device 100, the change confirmation device 200, and the change execution device 210 or each of the service provider S, the change content confirmer C, and the change executor I does not need to confirm the signature of the user in the previous step. Thereby, a setting condition of the facility can be changed more easily than in each embodiment described above.

As described above, according to each embodiment, in the remote service system, each user adds a signature to change information in a chain (time series) in each step. The change content sequentially confirmed by a plurality of users is applied to the facility. Thereby, it is possible to eliminate the confirmation of a related department of the plant that is conventionally required when a parameter value set in the facility is changed and to efficiently change a setting condition of the facility. Also, because the plurality of users confirm the change information, it is possible to prevent user spoofing or change information alteration during confirmation of the change information by a third party at a high security level. Thereby, in the plant to which the remote service system in each embodiment described above is applied, it is possible to correctly change a setting for changing a setting condition of the facility in a state in which a security level of setting data is maintained even if a setting condition of the facility of the plant is changed from a remote place. Also, in a state in which the security level of the setting data is maintained, a time period or cost incurred for the work to change a setting condition of the facility can be reduced by omitting an intermediate process such as an approval procedure at the plant or adjustment work in a place, which was conventionally necessary.

Also, in the second and third embodiments, each user performs an exchange via a block chain in the remote service system. Here, data exchanged by each user is managed by consensus building in the block chain (for example, the fact that signature confirmation results of half or more of the data server devices are the same or the like). Thus, the data registered in the block chain becomes data of a high security level.

Also, in the third embodiment, a signature confirmation processing program for confirming the signature of each user in the remote service system can be automatedly executed within the block chain. Here, the signature confirmation processing program is managed by the block chain. Thus, the signature confirmation processing program registered in the block chain is a program guaranteed at a high security level. That is, the signature confirmation processing program registered in the block chain is a program with high alteration resistance. Because the data and the signature confirmation processing program are managed by the block chain 20, i.e., a setting condition change request for a facility, an approval for the request, and a signature confirmation program are managed by the block chain 20, it is guaranteed that no alteration is performed and it is possible to change a setting of a facility from a remote place.

Also, in the first to third embodiments, a configuration in which a change in a setting condition of the facility is applied after the change content of the setting condition of the facility is confirmed in two steps in the remote service system has been described. More specifically, for example, a configuration in which the change executor I applies the change in the setting condition of the facility after a change in the setting condition of the facility requested by the service provider S is confirmed by the change content confirmer C in the first step and confirmed by the change executor I in the second step in the configuration of the remote service system 1 has been described. However, the steps of confirming the changed content of the setting condition of the facility in each remote service system described above are not limited to the two steps shown in each embodiment. For example, in the remote service system 1, the number of steps of confirming the change content of the setting condition of the facility may be further increased by increasing the number of staff members who confirm change information as in the change content confirmer C and allowing staff members to add signatures in a chain (time series) by confirming change content using corresponding computer terminals. In this case, it is possible to further improve robustness against alteration of the change content (change information) of the setting condition of the facility input by the service provider S. On the other hand, for example, the change content confirmer C also serves as the change executor I, so that the number of steps of confirming the change content of the setting condition of the facility in the remote service system 1 may be reduced. In this case, the change content (change information) of the setting condition of the facility requested by the service provider S can be applied to the target facility more quickly.

Also, in the second embodiment and the third embodiment, a configuration in which the change execution device 210 or the plant network device 300 registers the change result representing the operation state of the facility according to a changed setting condition of the facility in the block chain 20 after the setting condition of the facility is changed in the remote service system has been described. However, as described above, the change result may include data such as a KPI for calculating the efficiency of a facility in operation. Then, it is conceivable to calculate the KPI and the like for each predetermined period so that a change in the efficiency of a facility in operation is monitored in the plant. Thus, a configuration in which the change execution device 210 or the plant network device 300 calculates the KPI on the basis of data similar to the change result transmitted for each predetermined period regardless of whether or not a setting condition of the facility has been changed is conceivable. In this case, it is possible to confirm changes in the efficiency of the facility before and after the setting condition is changed and a change in the efficiency of the facility up to the present on the basis of the KPI calculated for each predetermined period. In other words, it is possible to confirm the effect of improving the efficiency of the facility obtained by changing the setting condition of the facility.

Incidentally, it is conceivable to use the effect of improving the efficiency of the facility as data for obtaining a reward for changing the setting condition of the facility (for example, asking a requester who has requested a change in the setting condition of the facility to pay an amount of money). Thus, it is conceivable to use the remote service system in each embodiment described above as a configuration for obtaining a reward for changing the setting condition of the facility. In this case, it is also possible to implement a configuration in which an amount of money to be paid is sequentially confirmed by adding a signature in a path opposite to a path used when the setting condition of the facility is changed. More specifically, for example, on the basis of KPIs before and after the change in the setting condition of the facility calculated by a component on the plant side such as the plant network device 300, the change execution device 210, or the like, a staff member of the plant side such as the change executor I confirms the effect of improving the efficiency of the facility to determine an amount of money to be paid and, for example, requests a staff member who confirms an amount of money to be paid on the plant side such as the change content confirmer C to confirm the determined amount of money to be paid. For example, it is possible to implement a configuration in which the staff member presents a determined amount of money to a requesting side (a requester) that has requested a change in the setting condition of the facility such as the service provider S and actually obtains a reward when the confirmed amount of money is a correct amount of money (which can be requested for payment without any problem). In the case of such a configuration, it is possible to conceive a configuration similar to a configuration in which a setting condition of the facility is changed and it is possible to efficiently perform a process of a procedure required to actually obtain a reward in a state in which the validity of an amount of money determined is maintained by maintaining a security level for data of a KPI that is original data for determining an amount of money to be paid.

Also, in addition to robustness against alteration of data of a KPI based on the above-described charging, it is possible to automatedly perform a charging process by storing a "charging rule according to a KPI" in the block chain 20 (for example, storing it as a smart contract code program). It is not necessary to confirm the charging rule every time the charging process is performed because the charging rule is a rule agreed upon by the service provider S and the change content confirmer C and both the service provider S and the change content confirmer C can efficiently provide and use a service because it is proved that the charging rule has not been altered. Also, when the charging rule is updated, the charging rule upon which the service provider S and the change content confirmer C have agreed again is registered in the block chain 20.

Also, a configuration, a process, and a work flow (a processing sequence) when the remote service systems according to the first to third embodiments are applied to obtain a reward for changing a setting condition of the facility can be easily conceived on the basis of the configurations, the processes, and the work flows (the processing sequences) of the remote service systems of the first to third embodiments for sequentially confirming a change in a setting condition of the facility. Accordingly, the detailed description of a specific example when the remote service system in each embodiment described above is applied to obtain a reward for changing the setting condition of the facility is omitted.

Also, a case in which control equipment changes a parameter value set in the facility has been described in each embodiment described above. However, for example, the remote service systems of the second and third embodiments are not limited to only the application to a system that changes a parameter value set in facility. More specifically, a case in which a remote service system is used to perform control such as permission or stopping of use of services such as an additional function to be executed by a plant control system that controls each facility in a plant is also conceivable. In this case, in an order opposite to the order described in each embodiment, the service provider side that provides the remote service system of each embodiment controls the use of a service such as an additional function in the plant control system.

For example, when a request for providing a service has been issued from the plant side in the remote service system 2, the service provider permits (approves) the request from the plant side, so that the use of a service such as an additional function in the plant control system is started. Also, for example, when it is necessary to stop the provided service for some reason, the service provider may independently issue a service stop instruction without obtaining the approval of the plant side and may cause a service such as an additional function in the plant control system to be stopped. Here, for example, as some reasons why it is necessary to stop the service provided by the service provider, the end of a use period of the provided service, non-payment or a delay in payment for a service use fee to be paid from the plant side to the service provider side as a reward for the provided service, and the like are conceivable.

Also, a case in which the service provider side can obtain information of a payment situation of a service use fee from the plant side from a charging system (not shown) or the like other than the remote service system 2 is conceivable. In the remote service system 2, information (data) of a payment situation of the service use fee obtained from a charging system (not shown) or the like is registered in the block chain, so that the service provider can manage the permission or stopping of use of a service provided together with a history of a payment situation of a service use fee. Thus, in the remote service system 2, information (data) of the payment situation of the service use fee obtained from a charging system (not shown) or the like is registered in the block chain. Also, the registration of information (data) of a payment situation of the service use fee in the block chain may be performed by the service provider, the charging system (not shown), or the like.

Fourth Embodiment

Here, a fourth embodiment will be described. A remote service system of the fourth embodiment is a system in which a service provider performs control such as the permission or stopping of use of a provided service from a remote place. Also, the remote service system of the fourth embodiment is an example of a configuration in which the permission or stopping of use of a service in the remote service system 2 or the like is controlled.

Also, in the remote service system of the fourth embodiment, information (data) of a payment situation of the service use fee is registered in the block chain at predetermined time intervals and a history of a payment situation of the service use fee from a power generation plant is managed. Thereby, the service provider can control the permission or stopping of use of a provided service or the like on the basis of a history of the information (data) of the payment situation of the service use fee whose alteration is difficult registered in the block chain.

Also, the components of the remote service system of the fourth embodiment are similar to the components shown in FIG. 3.

Also, in the remote service system of the fourth embodiment, confirmation by a staff member (a change executor I) who actually operates a facility in the power generation plant is not performed. This is because a service use request for an additional function to be executed by the plant control system is a request from a staff member who belongs to the same power generation plant side as the staff member who actually operates the facility in the power generation plant, so that it is not necessary to perform confirmation. Also, the stopping of the use of the service of the additional function to be executed by the plant control system is intended so that blocking by the staff member who actually operates the facility is prevented in the power generation plant.

Figure 8:
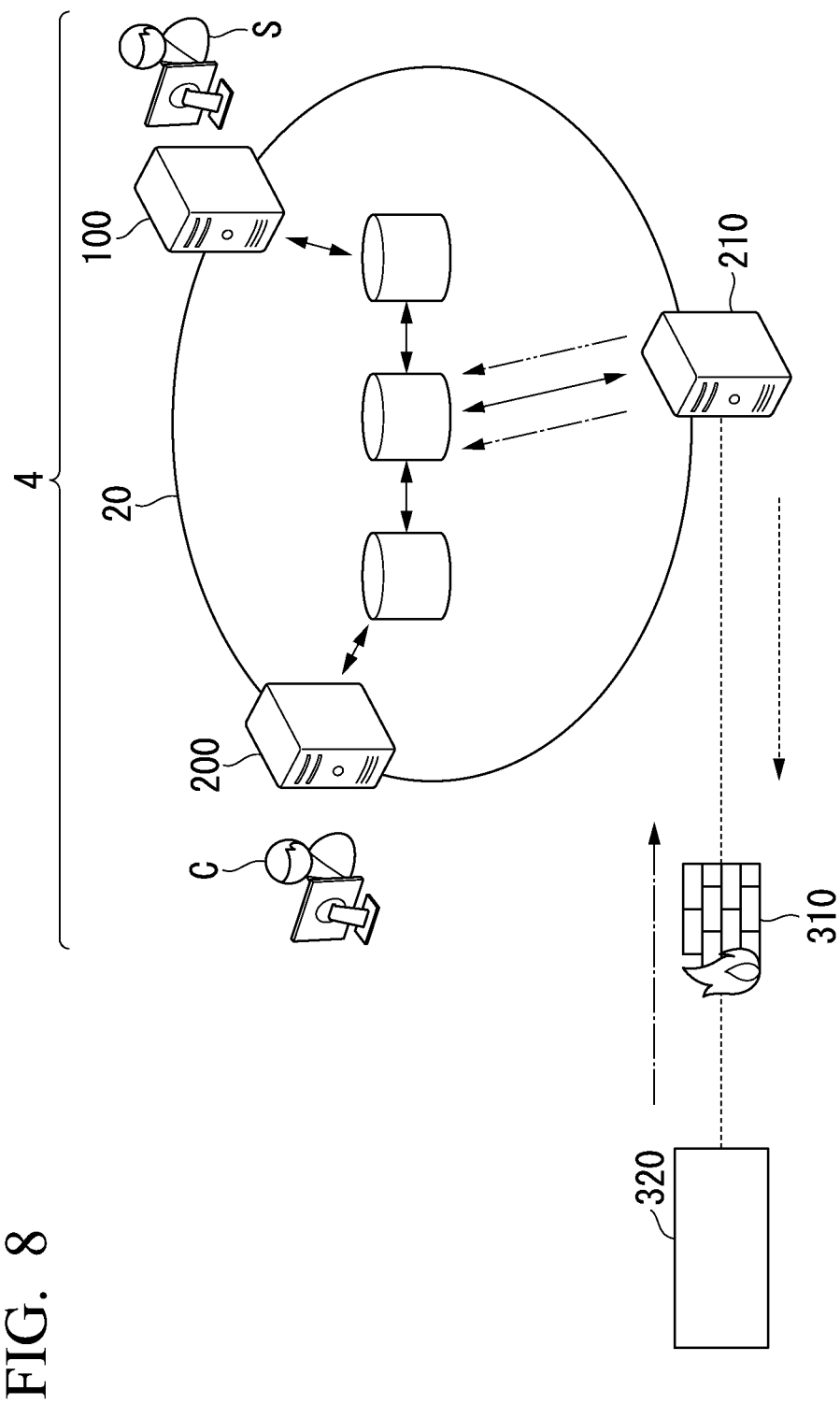
FIG. 8 is a block diagram showing a schematic configuration of a remote service system according to a fourth embodiment.

FIG. 8 is a block diagram showing a schematic configuration of a remote service system according to the fourth embodiment. The remote service system 4 is configured to include a change request device 100, a change confirmation device 200, and a change execution device 210. Each of the change request device 100, the change confirmation device 200, and the change execution device 210 is connected to the block chain 20. Also, in FIG. 8, the change executor I and the plant network device 300 related to the actual operation of the facility in the power generation plant are omitted from FIG. 3. The data diode 330 is also omitted from FIG. 8.

Also, in the following description, for example, a function of acquiring and transmitting data of a change result for calculating a KPI of the changed facility to be executed by the plant control system 320 will be described as a service of an additional function of the plant control system 320 provided from service provider side to the power generation plant side in the remote service system 4. Also, a staff member of the power generation plant side that requests the use of the service (an additional function of the plant control system 320) provided in the remote service system 4, i.e., a service requester, will be described as the change content confirmer C and a staff member of the service provider side that permits (approves) the use of the service, i.e., a service approver, will be described as the service provider S.

Also, in the remote service system 4, each of the change request device 100, the change confirmation device 200, and the change execution device 210 exchanges information (data) via the block chain 20. Also, in the remote service system 4, an operation of each of the change request device 100, the change confirmation device 200, and the change execution device 210 is similar to an operation of the remote service system 2.

Also, in the remote service system 4, information (data) of the payment situation of the service use fee of the power generation plant side for the service of the additional function of the provided plant control system 320 is registered in time series in the block chain 20 for each predetermined time interval (for example, every month) and is managed as a history whose alteration is difficult. Also, in the present disclosure, a method of registering payment data in the block chain 20 is not particularly specified.

Also, in the remote service system 4, the service provider S determines the permission or stopping of use of the provided service by confirming data of a payment situation of the service use fee (hereinafter referred to as payment data) registered in the block chain 20. In the remote service system 4, the service provider S registers data of usability information representing a result of determining the permission or stopping of use of the provided service in the block chain 20. Here, the usability information is control information (instruction information) in which a service execution or stop instruction according to the permission or stopping of use of a service determined by the service provider S is included as control content and which represents the control content (instruction content). In the remote service system 4, data of usability information of a service determined by the service provider S and registered in the block chain 20 is transmitted to the plant control system 320 and the execution of the additional function in the plant control system 320, i.e., the permission or stopping of use of the provided service, is controlled.

More specifically, in the remote service system 4, the change content confirmer C (a requester) requests the service provider S (the approver) to provide a service of an additional function to be executed by the plant control system 320 by registering the data of information for requesting the use of the service (hereinafter referred to as request information) in the block chain 20. Thereby, in the remote service system 4, the service provider S (the approver) confirms payment data registered in the block chain 20 and determines whether or not to permit (approve) a service use request from the change content confirmer C (the requester). When the service provider S permits (approves) the service use request from the change content confirmer C (the requester) in the remote service system 4, the additional function in the plant control system 320 is executed by registering data of usability information for issuing an instruction for executing an additional function in the plant control system 320 in the block chain 20. Thereby, in the remote service system 4, the service of the additional function executed by the plant control system 320 is provided to the power generation plant side.

On the other hand, in the remote service system 4, when the service provider S does not permit (denies) the service use request from the change content confirmer C (the requester) or, for example, when the end of a service use period, non-payment or a payment delay of the service use fee, or the like has been confirmed, the execution of the additional function in the plant control system 320 is stopped by registering data of the usability information for issuing an instruction for stopping the additional function in the plant control system 320 in the block chain 20. Thereby, in the remote service system 4, the provision of the service of the additional function executed by the plant control system 320 is stopped without obtaining the approval of the power generation plant side.

In the remote service system 4, the change execution device 210 does not confirm data of the usability information representing whether or not the service provider S has approved a service use request from the change content confirmer C registered in the block chain 20 as described above. Accordingly, in the remote service system 4, the change execution device 210 directly transmits the data of the usability information registered in the block chain 20 by the change request device 100 to the plant control system 320 via the firewall 310. At this time, the change execution device 210 transmits the data of the usability information to the plant control system 320 via a circuit of a dedicated communication standard determined with the plant control system 320 (hereinafter referred to as a direct communication circuit). Also, the direct communication circuit may be a circuit of a communication standard that is the same as that the dedicated communication circuit shown in the remote service system of each embodiment or a circuit of a communication standard different therefrom. Also, the direct communication circuit may be a communication circuit including the data diode 330.

Also, when the direct communication circuit is a communication circuit including the data diode 330 and the data diode 330 has a firewall function, the firewall 310 may not be included in the direct communication circuit.

Also, in the remote service system 4, the plant control system 320 transmits data of an execution state of the additional function or a result of the executed additional function according to the application of an instruction based on the usability information, which has been registered in the block chain 20 and transmitted, (hereinafter referred to as an application result) to the change execution device 210 via the firewall 310. In the remote service system 4, the change execution device 210 registers the data of the application result transmitted from the plant control system 320 in the block chain 20.

Thereby, in the remote service system 4, the service provider S (the approver) can confirm the execution state of the additional function by the plant control system 320, i.e., a result of controlling the execution or stopping of the provided service. At this time, the change request device 100 acquires the data of the application result registered in the block chain 20 by the change execution device 210 from the block chain 20 and presents the execution state of the additional function of the plant control system 320 included in data of the acquired application result to the service provider S (the approver). Also, in the power generation plant to which the remote service system 4 is applied, the change content confirmer C (the requester) can confirm the result data of the additional function executed by the plant control system 320. At this time, the change confirmation device 200 acquires the data of the application result registered in the block chain 20 by the change execution device 210 from the block chain 20 and presents the execution result of the additional function of the plant control system 320 included in the acquired application result data to the change content confirmer C (the requester).

Also, when the plant control system 320 has a configuration in which data can be exchanged with the block chain 20, the block chain 20 can be configured to directly transmit data of usability information registered by the change request device 100 to the plant control system 320 via a communication circuit without involving the change execution device 210. Thereby, in the power generation plant to which the remote service system 4 is applied, the plant control system 320 executes an additional function according to the data of the usability information registered in the block chain 20. Also, when the plant control system 320 has a configuration in which data can be exchanged with the block chain 20, the plant control system 320 can be configured to directly transmit the data of the application result to the block chain 20 via the communication circuit without involving the change execution device 210 and register the data.

Figure 9:
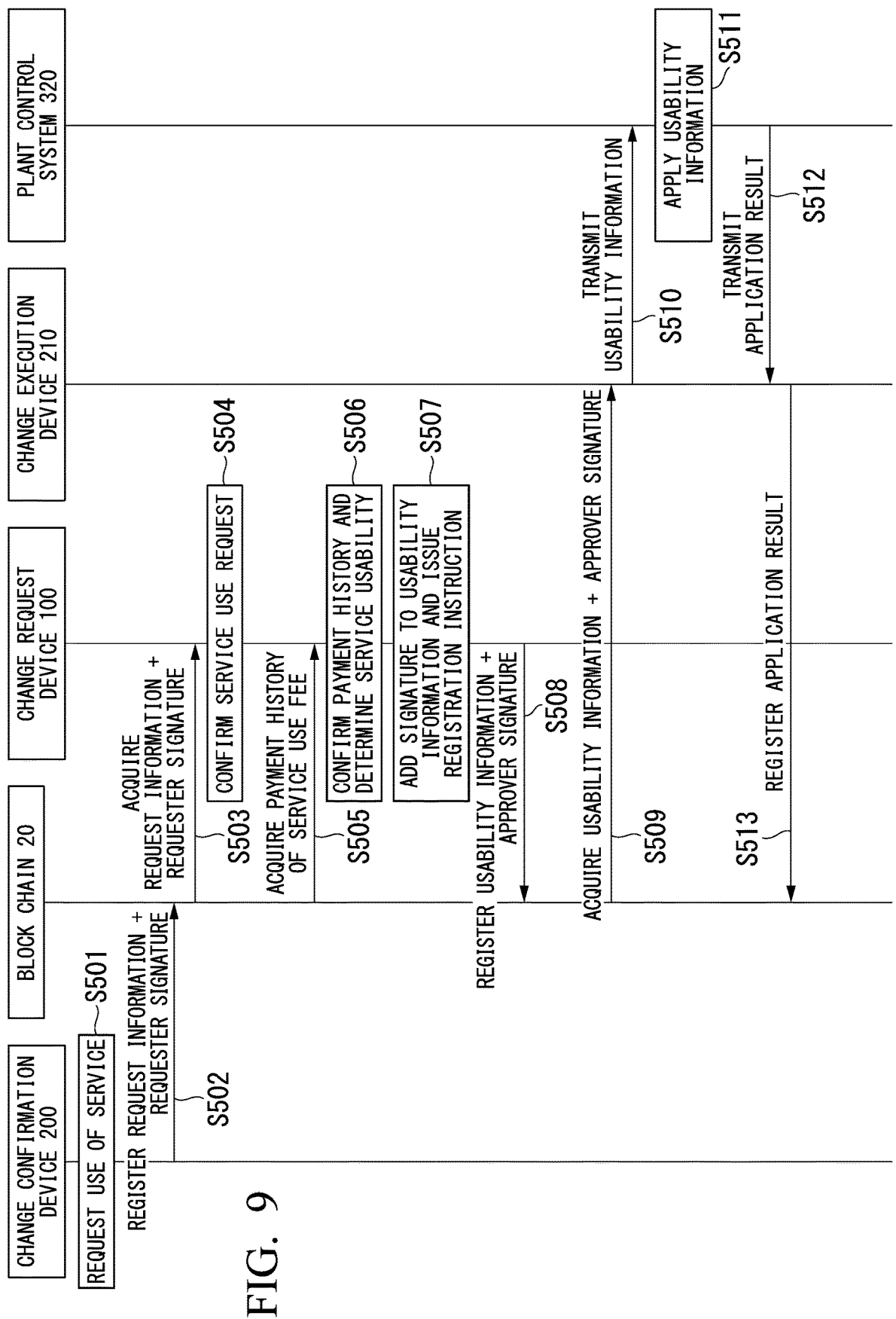
FIG. 9 is a sequence diagram showing a process and work flow in the remote service system of the fourth embodiment.

Next, the process and work for controlling the use of the service in the facility using the remote service system 4 will be described. FIG. 9 is a sequence diagram showing a process and work flow in the remote service system 4 of the fourth embodiment. FIG. 9 is a processing sequence when it is determined whether or not the service provider S (the approver) permits (approves) the use of the service in response to the service use request issued by the change content confirmer C (the requester). In FIG. 9, an example of a flow of a process in each of the block chain 20 and the change request device 100, the change confirmation device 200, and the change execution device 210 connected to the block chain 20, and the plant control system 320, which constitute the remote service system 4 is shown. Also, in FIG. 9, as in FIG. 4, work items of the service provider S (the approver) and the change content confirmer C (the requester) (operations on the change request device 100 and the change confirmation device 200) are shown together with the above process.

As described above, in the remote service system 4, the staff member who actually operates the facility in the power generation plant does not confirm data of the usability information by operating the change execution device 210. Thus, in the remote service system 4, the change execution device 210 automatedly exchanges data with the plant control system 320. In this regard, the change execution device 210 may automatedly perform a process of confirming a signature or a process of adding a signature so that a high security level in a data exchange between the block chain 20 and the change execution device 210 is secured. More specifically, the change execution device 210 may automatedly perform either a process of confirming a signature added to the data of the usability information acquired from the block chain 20 or a process of adding a signature to an application result transmitted from the plant control system 320 registered in the block chain 20. However, in the following description, for ease of the description, the detailed description of a process related to each of the signature confirmation and addition by the change execution device 210 will be omitted.

First, the change content confirmer C operates the change confirmation device 200 to input a request for using the service of the additional function to be executed by the plant control system 320 to the change confirmation device 200 and add a signature. Subsequently, the change content confirmer C operates the change confirmation device 200 to issue an instruction for registering a service use request (request information) and the signature of the change content confirmer C (the requester) (hereinafter referred to as a requester signature) in the block chain 20 (step S501).

Thereby, the change confirmation device 200 registers data of "request information+requester signature" in which service use request information input by the change content confirmer C and a signature added by the change content confirmer C are associated in the block chain 20 (step S502). At this time, the change confirmation device 200 encodes the requester signature using a predetermined key (a public key, a secret key, a common key, or the like) of the change content confirmer C and registers the data of "request information+requester signature" in the block chain 20. Also, the data of "request information+requester signature" registered in the block chain 20 by the change confirmation device 200 is managed as a history of the service use request of the change content confirmer C.

Subsequently, the service provider S regularly operates the change request device 100 to confirm whether or not the data of "request information+requester signature" has been registered in the block chain 20 by the change confirmation device 200, i.e., whether or not a service use request from the change content confirmer C has been issued. When the data of "request information+requester signature" has been registered in the block chain 20 by the change confirmation device 200, the service provider S operates the change request device 100 to acquire data of "request information+requester signature" registered in the block chain 20 from the block chain 20 (step S503).

Also, the block chain 20 may be configured to notify the change request device 100 that the data of "request information+requester signature" has been registered by the change confirmation device 200. In this case, when the notification has been provided from the block chain 20, the service provider S may operate the change request device 100 to acquire the data of "request information+requester signature" registered in the block chain 20 by the change content confirmer C.

Thereby, the change request device 100 presents the service use request information and the requester signature included in the acquired data of "request information+requester signature" to the service provider S. At this time, the change request device 100 decodes the requester signature included in the acquired data of "request information+requester signature" using a key (a public key, a secret key, a common key, or the like) of the change content confirmer C that has been previously obtained to confirm the requester signature and presents the request information and the requester signature to the service provider S together with a confirmation result. The service provider S confirms the request information and the requester signature presented by the change request device 100 (step S504).

When the presented requester signature is correct and the service requested by the presented request information can be provided, the service provider S operates the change request device 100 to acquire a history of information (data) of a payment situation of a service use fee from the change content confirmer C registered in the block chain 20 from the block chain 20 (step S505). That is, when the requester signature presented by the change request device 100 is a signature of an official user of the remote service system 4 that can use the service and a service shown in the request information is a service of an additional function of the plant control system 320 capable of providing the service, the service provider S acquires a history of a payment situation of the service use fee from the power generation plant side to which the change content confirmer C belongs from the block chain 20.

Thereby, the change request device 100 presents the acquired history of the payment situation of the service use fee to the service provider S. The service provider S confirms the history of the payment situation of the service use fee presented by the change request device 100. The service provider S determines whether or not the service use request from the change content confirmer C is to be permitted, i.e., whether or not the requested service can be used, on the basis of the confirmed history of the payment situation of the service use fee (step S506).

The service provider S operates the change request device 100 to input a result representing usability of the service of the additional function to be executed by the plant control system 320 to the change request device 100 and add a signature. Subsequently, the service provider S operates the change request device 100 to issue an instruction for registering usability information representing a service usability determination result and the signature of the service provider S (the approver) (hereinafter referred to as an approver signature) in the block chain 20 (step S507).

Thereby, the change request device 100 registers the data of "usability information+approver signature" in which the service usability information input by the service provider S and the approver signature are associated in the block chain 20 (step S508). At this time, the change request device 100 encodes the approver signature using a predetermined key (a public key, a secret key, a common key, or the like) of the service provider S and registers the data of "usability information+approver signature" in the block chain 20. Also, the data of "usability information+approver signature" registered in the block chain 20 by the change request device 100 is managed as a usability history determined by the service provider S with respect to a service use request from the change content confirmer C.

Also, the block chain 20 may be configured to notify the change confirmation device 200 that the data of "usability information+approver signature" has been registered by the change request device 100. In this case, the change content confirmer C can operate the change confirmation device 200 when the notification has been provided from the block chain 20 to confirm the data of "usability information+approver signature" registered in the block chain 20 by the service provider S, i.e., a requested service usability determination result. When the service usability determination result of the service provider S indicates, for example, that the service is not usable (has been denied), the change content confirmer C can ask the service provider S (the service provider side) about the reason why the service is not usable (has been denied) (for example, the end of a service use period, non-payment or a payment delay of the service use fee, or the like).

Subsequently, the change execution device 210 regularly confirms whether or not the data of "usability information+approver signature" has been registered in the block chain 20 by the change request device 100, i.e., whether or not a service execution (also including continuation) or stop instruction has been issued. When the data of "usability information+approver signature" has been registered in the block chain 20 by the change request device 100, the change execution device 210 acquires the data of "usability information+approver signature" registered in the block chain 20 from the block chain 20 (step S509).

Also, when the block chain 20 is configured to notify the change execution device 210 that the data of "usability information+approver signature" has been registered, the change execution device 210 may be configured to acquire the data of "usability information+approver signature" registered in the block chain 20 in accordance with the notification from the block chain 20.

The change execution device 210 transmits the usability information included in the acquired data of "usability information+approver signature" to the plant control system 320 via the direct communication circuit (step S510).

Also, the change execution device 210 may automatedly confirm the approver signature included in the acquired data of "usability information+approver signature" and transmit the acquired usability information to the plant control system 320 when the confirmed approver signature is correct. At this time, the change execution device 210 automatedly decodes the approver signature included in the acquired data of "usability information+approver signature" using a key (a public key, a secret key, a common key, or the like) of the service provider S that has been previously obtained and confirms the approver signature.

Thereby, when the plant control system 320 receives data of the usability information transmitted from the change execution device 210 via the direct communication circuit, the plant control system 320 applies a service execution or stop instruction included in the received data of the usability information to the execution of the additional function (step S511). More specifically, the plant control system 320 performs the execution of the additional function (including continuation) when the instruction included in the data of the usability information represents the execution of the additional function and stops the execution of the additional function when the instruction included in the data of the usability information represents the stopping of the execution of the additional function. In this manner, in the remote service system 4, the execution of the service provided by the additional function of the plant control system 320 is controlled by the service provider S.

The plant control system 320 transmits data of the application result representing the execution state of the additional function due to the application of the instruction included in the data of the usability information to the change execution device 210 via the direct communication circuit (step S512). Also, when the instruction included in the data of the usability information represents the execution of the additional function, the plant control system 320 may transmit result data of the executed additional function to the change execution device 210 together with the data of the application result. Also, the plant control system 320 may automatedly add a signature of the plant control system 320 (a plant signature) to the data of the application result transmitted to the change execution device 210 and transmit the data to the change execution device 210.

Subsequently, when the change execution device 210 receives the data of the application result transmitted from the plant control system 320, the change execution device 210 registers the received data of the application result in the block chain 20 (step S513). At this time, the change execution device 210 may automatically add a signature representing the change execution device 210 to the data of the application result registered in the block chain 20, encode the data using a predetermined key (a public key, a secret key, a common key, or the like) of the change execution device 210, and register the data of "application result+signature" in the block chain 20.

Thereby, the service provider S can regularly operate the change request device 100 to confirm whether or not the data of the application result has been registered in the block chain 20 by the change execution device 210 and confirm the execution state of the additional function in the plant control system 320 from the registered data of the application result. Also, the change content confirmer C can regularly operate the change confirmation device 200 to confirm data of an execution result of a service of the additional function that has been requested by confirming whether or not the data of the application result has been registered in the block chain 20 by the change execution device 210.

Also, the block chain 20 may be configured to notify the change request device 100 and the change confirmation device 200 that the data of the application result has been registered by the change execution device 210.

According to the configuration, the process, and the work flow (the processing sequence) described above, in the remote service system 4, the service provider S (the approver) controls the execution of the additional function of the plant control system 320 by registering the usability information for issuing a service execution or stop instruction in the block chain 20. Thereby, in the remote service system 4, data of the usability information registered in the block chain 20 by the approver is directly transmitted to the plant control system 320 and the plant control system 320 applies an instruction included in the transmitted data of the usability information and executes or stops the additional function. That is, in the remote service system 4, the approver can independently control the permission or stopping of use of the provided service on the basis of a history of a payment situation of the service use fee from the requester.

Moreover, because the remote service system 4 adopts a data management method of making it difficult to alter data and manages a history of registered payment data in time series, it is possible to present the clear reason why the permission or stopping of use of the service provided by the approver is controlled to the requester. For example, even if an instruction for stopping the use of the provided service has been issued in the remote service system 4, it is possible to present the instruction based on the application result determined on the basis of the history of payment data managed at a high security level to the requester. That is, the remote service system 4 can prove that both the approver and the requester do not have any doubt about a determination result.

Also, a case in which the approver determines the permission or stopping of use of the service in response to the service use request issued by the requester has been described in the processing sequence shown in FIG. 9. However, in the remote service system 4, for example, it is necessary to stop the use of the service regardless of whether or not the service use request has been issued from the requester when the end of a provided service use period, non-payment or a payment delay of the service use fee, or the like has been confirmed. This is to promptly stop the execution of the additional function by the plant control system 320 when the end of a provided service use period, non-payment or a payment delay of the service use fee, or the like has been confirmed. Accordingly, in the processing sequence in this case, the process of the change confirmation device 200 and the operation of the change confirmation device 200 by the change content confirmer C in FIG. 9 are irrelevant. More specifically, in the remote service system 4, the processing from step S504 in the sequence diagram shown in FIG. 9 will be performed. In this case, the detailed description of the processing sequence is omitted.

Also, a case in which the permission or stopping of use of the service provided by the additional function of the plant control system 320 is controlled in the remote service system 4 has been described. However, the control in the remote service system 4 is not limited to the permission or stopping of the use of the provided service. For example, the service provider side can independently control a change in a parameter value, a change in a setting, initialization, and the like in the additional functions to be executed by the plant control system 320 on the basis of a similar concept. In this case, it is determined whether or not a change in a parameter value, a change in a setting, initialization, or the like is possible according to, for example, whether or not the parameter value can be correctly adopted. Also, the service provider side can independently control the update of a program such as performance enhancement (program upgrade) or standard performance enhancement (program degradation) of the additional function to be executed by the plant control system 320 on the basis of a similar concept. In this case, for example, it is determined whether or not the program can be updated according to, for example, whether or not the program can be overwritten.

Also, the configuration in which the block chain 20 is adopted as a data management method of making it difficult to alter data in the remote service system 4, has been described. Thus, a configuration in which a process or work of the service provider S (the approver) is automatedly performed by registering a program (a smart contract code) for executing a process according to a predetermined rule on the service provider side and the plant side in the block chain can also be adopted. That is, a configuration in which a determination or an action related to the provision of a service in the remote service system 4 is automatedly performed according to a smart contract code program can also be adopted. Because this smart contract code program is a program that cannot be changed independently by the service provider side or the plant side (and in which user spoofing or alteration by a third party is also impossible), the determination or the action by the program will result in no suspicion by both the service provider side and the plant side.

For example, a case in which a program in which the stopping of use of a provided service is defined when the service use period ends or when non-payment of the service use fee from the plant side to the service provider side, a payment delay, or the like is caused is registered as a smart contract code program in the block chain is conceivable. In this case, even if a result of the determination or the action by the smart contract code program is, for example, a result indicating the stopping of the service due to the non-payment of the service use fee, the result can be said as a result of a correct determination or action according to a predetermined rule on the service provider side and the plant side. As described above, a service usability determination result of the service provider side (the service provider S) for the service use request from the plant side (the change content confirmer C) or the service use request from the plant side is registered in the block chain and is managed as a history. Thereby, the service provider side and the plant side can mutually confirm the clear reason why the use of the service provided by the service provider side has been stopped according to the smart contract code program.

Also, the detailed description of a configuration and a process when the smart contract code program has been adopted is omitted.

Also, a case in which the number of services of the additional function to be executed by the plant control system 320 is one in the remote service system 4 has been described. However, in the power generation plant, the plant control system 320 may control a plurality of facilities arranged within the power generation plant. Thus, a case in which the additional function executed by the plant control system 320 is an additional function corresponding to each facility or an additional function different for each facility in the remote service system 4 is conceivable. In this case, in the remote service system 4, it is necessary to control the permission or stopping of the use of the provided service for an additional function corresponding to each facility.

Fifth Embodiment

Here, a case in which the permission or stopping of use of a provided service is controlled for an additional function corresponding to each facility to be executed by the plant control system 320 in the remote service system 4 will be described as a fifth embodiment. Also, in the following description, a remote service system configured to control the permission or stopping of use of the provided service for the additional function corresponding to each facility to be executed by the plant control system 320 will be described as a "remote service system 5."

Figure 10:
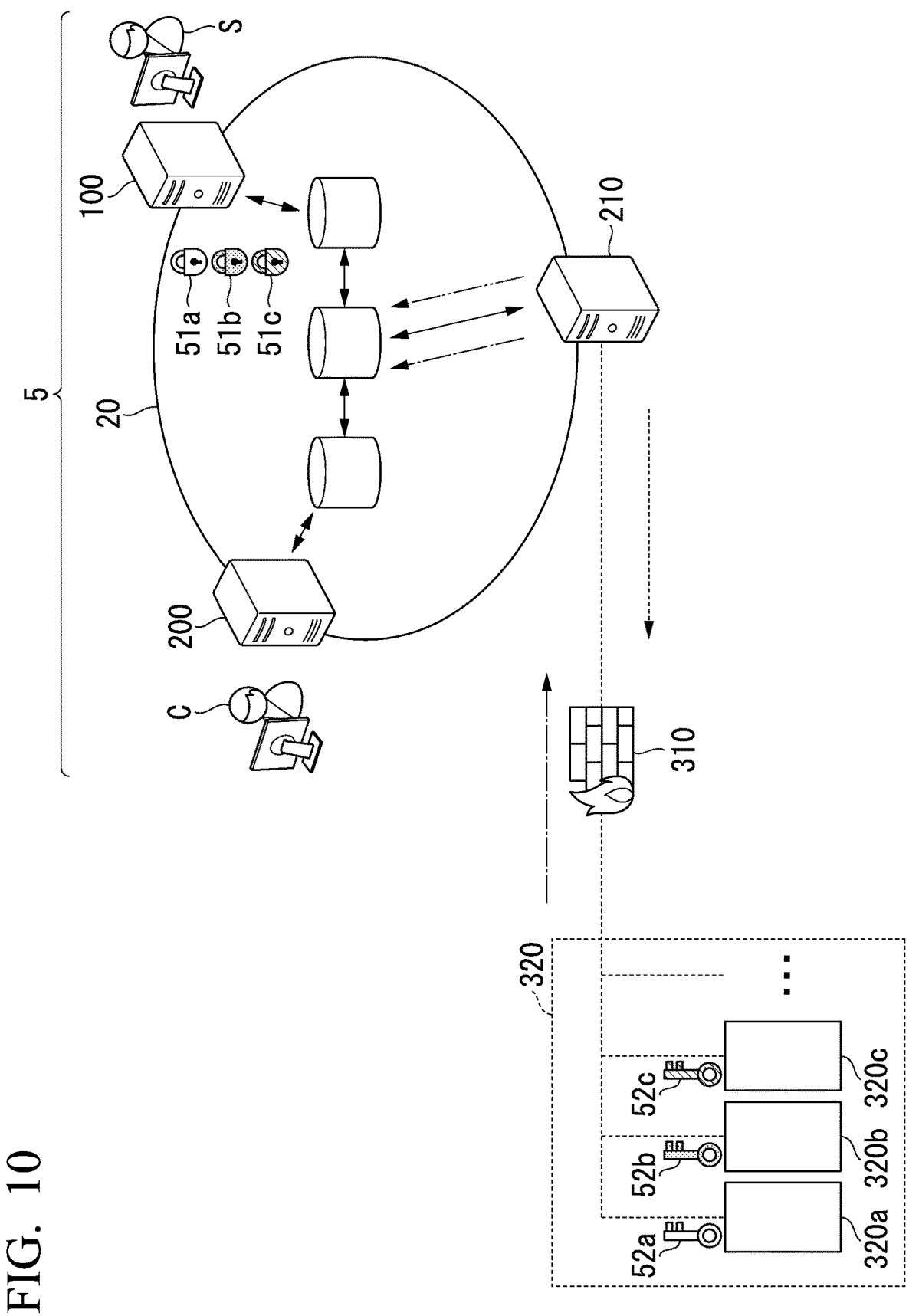
FIG. 10 is a block diagram showing a schematic configuration of a remote service system according to a fifth embodiment.

FIG. 10 is a block diagram showing a schematic configuration of a remote service system in the fifth embodiment. The remote service system 5 is configured to include a change request device 100, a change confirmation device 200, and a change execution device 210. In the remote service system 5, each of the change request device 100, the change confirmation device 200, and the change execution device 210 is connected to a block chain 20. Also, in FIG. 10, as in FIG. 8, a change executor I, a plant network device 300, and a data diode 330 related to an actual operation of a facility in a power generation plant are omitted.

The remote service system 5 is different in that the plant control system 320 shown in FIG. 8 is control equipment that controls a plurality of facilities. More specifically, the plant control system 320 in the remote service system 5 is different from the plant control system 320 in the remote service system 4 in that the plant control system 320 in the remote service system 5 executes an additional function corresponding to each of three facilities 320a to 320c. Thus, for each of the three facilities (the facilities 320a to 320c) controlled by the plant control system 320, the permission or stopping of use is controlled for the service of the additional function to be executed. However, the other configuration of the remote service system 5 is similar to the configuration of the remote service system 4. Accordingly, in the following description, the detailed description of the configuration and the operation similar to those of the remote service system 4 will be omitted and a configuration and an operation for controlling an additional functions of each facility to be executed by the plant control system 320 in the remote service system 5, i.e., the permission and stopping of use of the service corresponding to each facility, will be mainly described.

In the remote service system 5, the execution of an additional function corresponding to each facility is controlled using a public key and a secret key predetermined with each facility to be controlled by the change request device 100 and the plant control system 320 so that additional functions corresponding to facilities to be controlled by the plant control system 320 are distinguished. That is, in the remote service system 5, usability information is encoded and transmitted using the public key of the corresponding facility, the transmitted usability information is decoded using the secret key of the corresponding facility, and the additional function corresponding to each facility is executed. In FIG. 10, a public key 51a and a secret key 52a corresponding to the facility 320a, a public key 51b and a secret key 52b corresponding to the facility 320b, and a public key 51c and a secret key 52c corresponding to the facility 320c are shown.

Thereby, in the remote service system 5, only the usability information corresponding to each facility is applied and the additional function is executed. For example, a case in which the usability information is applied to only the facility 320b is conceivable. In this case, the change request device 100 registers the usability information encoded by the public key 51b in the block chain 20. Thereby, even if the change execution device 210 transmits the usability information without distinguishing the facilities 320a to 320c, the usability information is applied to only the facility 320b that can decode the usability information with the secret key 52b. In other words, because the usability information corresponding to the facility 320b transmitted by the change execution device 210 cannot be decoded with the secret key 52a or the secret key 52c, it is not applied to the facility 320a or the facility 320c.

Also, for example, a case in which different usability information is applied to each of the facilities 320a to 320c in the remote service system 5 is conceivable. In this case, the change request device 100 registers the usability information corresponding to the facility 320a encoded with the public key 51a, the usability information corresponding to the facility 320b encoded with the public key 51b, and the usability information corresponding to the facility 320c encoded with the public key 51c in the block chain 20. Thereby, the usability information corresponding to the facility 320a that can be decoded with the secret key 52a out of the usability information transmitted by the change execution device 210 is applied only to the facility 320a. Also, the usability information corresponding to the facility 320b that can be decoded with the secret key 52b out of the usability information transmitted by the change execution device 210 is applied only to the facility 320b. Further, the usability information corresponding to the facility 320c that can be decoded with the secret key 52c out of the usability information transmitted by the change execution device 210 is applied only to the facility 320c. That is, the usability information transmitted by the change execution device 210 is applied to only the corresponding facility.

In this manner, in the remote service system 5, correct usability information is applied to each facility to be controlled by the plant control system 320 using the public key and the secret key corresponding to each facility. In other words, even if incorrect usability information is transmitted to the plant control system 320, it is possible to prevent the incorrect usability information from being applied to the facility. That is, it is possible to prevent a malfunction of the facility due to the incorrect usability information applied to the facility. Thus, the change execution device 210 does not need to transmit the usability information after recognizing the facility to be applied and can easily perform control when the usability information is transmitted to the plant control system 320.

Figure 11:
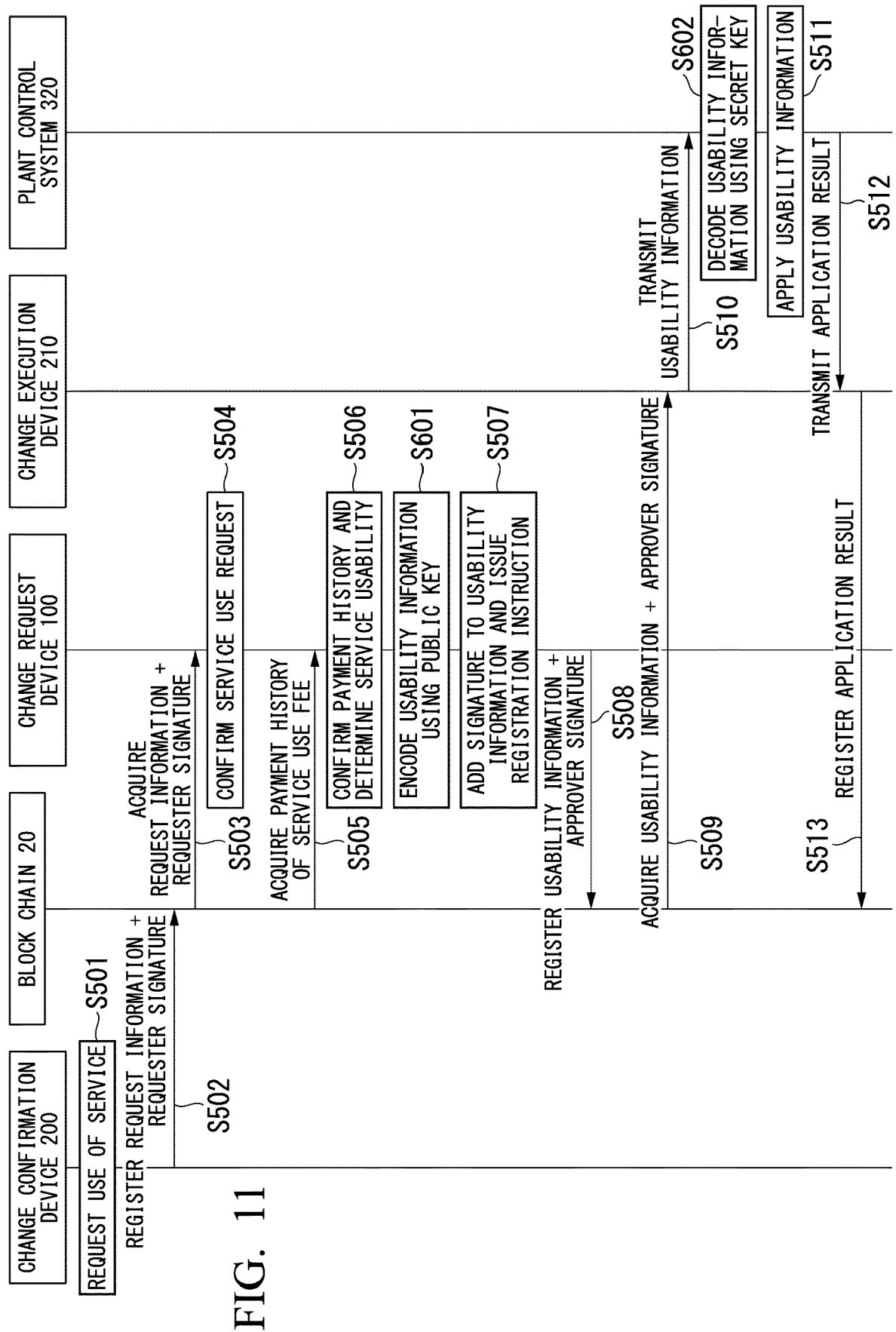
FIG. 11 is a sequence diagram showing a process and work flow in the remote service system of the fifth embodiment.

Next, the process and work of transmitting usability information in the facility using the remote service system 5 will be described. FIG. 11 is a sequence diagram showing a process and work flow in the remote service system 5 of the fifth embodiment. In the processing sequence shown in FIG. 11, it is determined whether or not the service provider S (the approver) permits (approves) the use of the service in response to a service use request issued by the change content confirmer C (a requester). In FIG. 11, an example of a flow of a process in each of the block chain 20 and the change request device 100, the change confirmation device 200, and the change execution device 210 connected to the block chain 20, and the plant control system 320, which constitutes the remote service system 5 is shown. Also, work items of the service provider S (the approver) and the change content confirmer C (the requester) (operations on the change request device 100 and the change confirmation device 200) are shown together with the above process.

In the remote service system 5, the change request device 100 encodes usability information using a predetermined public key between the change request device 100 and each facility to be controlled by the plant control system 320 and registers the encoded usability information in the block chain 20. Thus, in FIG. 11, when the change request device 100 registers the usability information in the block chain 20, a process of encoding the usability information using the corresponding public key is added. Also, in FIG. 11, when the change confirmation device 200 applies the transmitted usability information, a process of decoding the usability information using a corresponding secret key is added. Also, another process and work flow in the remote service system 5 are similar to those in the remote service system 4. Accordingly, in FIG. 11, the same step numbers are given to the process and work flow similar to those of the remote service system 4 to simplify the description and a different work flow will be mainly described.

Also, in the following description, the description will be given under the assumption that the change content confirmer C has issued a service use request corresponding to each of the facilities 320a to 320c shown in FIG. 10.

In steps S501 to S502, the change confirmation device 200 registers data of "request information+requester signature" in which a service use request (request information) corresponding to each facility input by the change content confirmer C and a requester signature are associated in the block chain 20.

Subsequently, in step S503 to step S506, the change request device 100 acquires the data of "request information+requester signature" registered in the block chain 20 and further acquires a history of information (data) of a payment situation of a service use fee from the change content confirmer C. The service provider S determines whether or not the service corresponding to each facility requested by the change content confirmer C can be used and operates the change request device 100 to input a result (usability information) representing usability of a service corresponding to each facility that has been determined to the change request device 100.

The service provider S operates the change request device 100 to issue an instruction for encoding using a public key of the usability information representing a service usability determination result (step S601). More specifically, the service provider S issues an instruction for encoding using the public key 51a of the usability information representing the service usability determination result corresponding to the facility 320a. Also, the service provider S issues an instruction for encoding using the public key 51b of the usability information representing the service usability determination result corresponding to the facility 320b. Also, the service provider S issues an instruction for encoding using the public key 51c of the usability information representing the service usability determination result corresponding to the facility 320c. Thereby, the change request device 100 encodes usability information using the corresponding public key.

Also, because the service usability determination result corresponding to each facility requested from the change content confirmer C (usability information corresponding to each facility) is a result determined for each facility to be controlled by the plant control system 320, content of the instruction for executing the corresponding additional function are not necessarily the same. Also, a case in which a service use request corresponding to any facility has not been issued from the change content confirmer C or a case in which a service usability determination result of the service provider S is a result that is the same as a previous result, i.e., a result representing that an instruction for executing the additional function corresponding to each facility is continued, is conceivable. Thus, the service provider S may input only the usability information having a result different from the previous result to the change request device 100. The service provider S may instruct the change request device 100 to encode only the usability information having a result different from the previous result using the corresponding public key.

In steps S507 and S508, the change request device 100 registers data of "usability information+approver signature" in which the usability information corresponding to each facility input by the service provider S and the signature of the service provider S (the approver) are associated in the block chain 20.

Subsequently, in steps S509 and S510, the change execution device 210 acquires the data of "usability information+approver signature" registered in the block chain 20 and transmits each usability information included in the acquired data of "usability information+approver signature" to the plant control system 320 via a direct communication circuit.

Thereby, when the data of each usability information transmitted from the change execution device 210 via the direct communication circuit is received, the plant control system 320 decodes the received each usability information using the corresponding secret key (step S602).

Also, the usability information transmitted from the change execution device 210 does not necessarily include usability information corresponding to all facilities that are controlled by the plant control system 320. A case in which facilities corresponding to the usability information transmitted from the change execution device 210 are not distinguished is also conceivable. In this case, the plant control system 320 decodes a usability information item with each secret key corresponding to the facility to be controlled. When the usability information can be decoded, the plant control system 320 recognizes that the usability information is usability information of the facility corresponding to the secret key used for the decoding.

In steps S511 and S512, the plant control system 320 applies the instruction from the service provider S included in data of the decoded usability information to each corresponding facility and transmits data of an application result of applying the usability information to the change execution device 210 via a direct communication circuit. In this manner, in the remote service system 5, the service provider S controls the execution of the service provided by each facility to be controlled by the plant control system 320.

Subsequently, in step S513, the change execution device 210 registers the data of the application result transmitted from the plant control system 320 in the block chain 20. Thereby, the service provider S can confirm the data of the application result registered in the block chain 20 by the change execution device 210 and confirm an execution state of the service in each facility to be controlled by the plant control system 320. Also, the change content confirmer C can confirm the data of the application result registered in the block chain 20 by the change execution device 210 and confirm requested data of the execution result of the service corresponding to each facility.

According to the configuration, the process, and the work flow as described above, when the plant control system 320 is configured to control a plurality of facilities in the remote service system 5, the service provider S (the approver) encodes usability information for issuing an instruction for executing or stopping a service in each facility using the public key of the corresponding facility and registers the encoded usability information in the block chain 20. The plant control system 320 decodes the transmitted usability information using the secret key of the corresponding facility and executes the service of the additional function corresponding to each facility. That is, it is possible to prevent erroneous usability information from being applied to each facility to be controlled by the plant control system 320 using the public key and the secret key corresponding to each facility. Thereby, it is possible to obtain effects similar to those of the remote service system 4.

Moreover, because the remote service system 5 also adopts a data management method of making it difficult to alter data, it is possible to control the permission or stopping of use of the service provided by the service provider S (the approver) without allowing both the service provider S (the approver) and the change content confirmer C (the requester) to have any doubt.

Also, a case in which the service provider S (the approver) determines the permission or stopping of use of the service in response to the service use request issued from the change content confirmer C (the requester) in the processing sequence shown in FIG. 11 has been described. However, in the remote service system 5, for example, it is possible to stop the use of the service regardless of whether or not the service use request has been issued from the change content confirmer C (the requester) when the end of a provided service use period, non-payment or a payment delay of the service use fee, or the like has been confirmed. In this case, the detailed description of the processing sequence is omitted.

Also, in the remote service system 5, the service provider side can independently control a change in a parameter value, a change in a setting, initialization, updating of a program, and the like in the additional functions to be executed in correspondence with facilities to be controlled by the plant control system 320 on the basis of a similar concept.

Also, a configuration in which a process or work of the service provider S (the approver) is automatically performed by registering a program (a smart contract code) for executing a process according to a predetermined rule on the service provider side and the plant side in the block chain can also be adopted in the remote service system 5. In this case, a configuration in which the usability information using the public key of the corresponding facility is also automatically encoded by a smart contract code program registered in the block chain, for example, such as an encoding processing program, can be adopted. Thereby, the service provider S may prevent an instruction for encoding the usability information from being erroneously issued or prevent the usability information from being erroneously encoded according to user spoofing or alteration by a third party. The detailed description of the configuration and the process when a smart contract code program (an encoding processing program) is adopted in the remote service system 5 will be omitted, but an outline of the process will be described below.

Also, in the following description, as in the case of FIG. 11, the description will be given under the assumption that the change content confirmer C has issued a service use request corresponding to the facility 320a shown in FIG. 10.

First, the change confirmation device 200 registers data of "request information+requester signature" in which a request (request information) for using a service corresponding to the facility 320a input by the change content confirmer C and the requester signature are associated in the block chain 20. At this time, the change confirmation device 200 registers the request information in the block chain 20 without encoding request information. This is because the service provider S, i.e., the change request device 100 or the block chain 20, does not have the secret key 52a corresponding to the facility 320a and the service provider S cannot decode the request information and cannot confirm the content of the request information when the request information is encoded and registered in the block chain 20.

Subsequently, the service provider S operates the change request device 100 to confirm the content of the request information and transmit data of "usability information+approver signature" in which the usability information corresponding to the facility 320a and the signature of the service provider S (the approver) are associated and information for designating the encoding processing program to the block chain 20. At this time, the service provider S gives the encoding processing program by designating the "facility 320a" as an argument. Thereby, the block chain 20 automatically encodes the received data of "usability information" using the public key 51a of the facility 320a according to the encoding processing program and registers the encoded data in the block chain 20. Also, in the block chain 20, the encoding processing program encodes received data of "usability information" using the public key 51a of the facility 320a and registers the encoded data, for example, when half or more of the data server devices confirm that the approver signature confirmed by the data server devices is a correct approver signature in the signature confirmation processing program.

That is, when the encoding processing program is registered as a smart contract code program in the block chain 20 in the remote service system 5, the encoding processing program encodes the usability information using a public key of a corresponding facility after the usability information is approved by the service provider S and registers the usability information in the block chain 20. In other words, when the encoding processing program is registered as the smart contract code program in the block chain 20 in the remote service system 5, the encoding processing program encodes usability information using a public key of a corresponding facility and registers the usability information in the block chain 20 before the change execution device 210 finally transmits the usability information to the plant control system 320.

Subsequently, the change execution device 210 transmits the encoded usability information registered in the block chain 20 to the plant control system 320 as it is. That is, the change execution device 210 transmits the encoded usability information registered in the block chain 20 to the plant control system 320 without confirming the signature of the service provider S (an approver signature) or the like.

As described above, when the encoding processing program is registered in the block chain 20 in the remote service system 5, the service provider S, i.e., the change request device 100, can automatically encode the usability information and register the encoded usability information in the block chain 20 by applying an argument representing a target facility to be controlled to the encoding processing program. Thereby, even if the encoding processing program is registered in the block chain 20 in the remote service system 5, the service provider S (the approver) can encode the usability information for issuing an instruction for executing or stopping the service in each facility using a public key of a corresponding facility and transmit the encoded usability information to the plant control system 320. The plant control system 320 decodes the transmitted usability information using a secret key of the corresponding facility and executes the service of the additional function corresponding to each facility. Thereby, even if the encoding processing program is registered in the block chain 20 in the remote service system 5, it is possible to prevent erroneous usability information from being applied to each facility to be controlled by the plant control system 320.

Also, in the above description, a case in which the service provider S (approver) determines the permission or stopping of use of the service in response to the service use request issued by the change content confirmer C (the requester) has been described. However, even if the encoding processing program has been registered in the block chain 20 in the remote service system 5, the service provider side can independently control a change in a parameter value, a change in a setting, initialization, updating of a program, and the like in the additional functions to be executed in correspondence with facilities to be controlled by the plant control system 320 on the basis of a similar concept.

Also, because the public key to be used for encoding the usability information can be registered in the block chain 20 in the remote service system 5, it is possible to prevent user spoofing or alteration by a third party at a high security level. However, because the secret key to be used by the plant control system 320 for decoding the usability information has not been registered in the block chain 20, user spoofing or alteration by a third party is also conceivable. When the secret key to be used by the plant control system 320 for decoding the usability information has been changed due to alteration, a service execution or stop instruction of the service provider S is not correctly applied to the plant control system 320. Thus, it may be desirable that the plant control system 320 be provided with a mechanism for confirming whether or not the secret key used for decoding the usability information matches the public key used for encoding the usability information. In other words, it may be desirable to have a mechanism capable of detecting whether or not the secret key has been altered.

Sixth Embodiment

Here, a mechanism for detecting whether or not a secret key to be used by the plant control system 320 for decoding usability information has been altered in the remote service system 5 will be described as a sixth embodiment. In the following description, a remote service system having a mechanism for detecting whether or not a secret key of the plant control system 320 has been altered, i.e., for confirming whether or not a public key and a secret key match will be described as a "remote service system 6."

In the remote service system 6, a program (hereinafter referred to as a secret key confirmation processing program) for executing a process of confirming a match between the secret key and the public key corresponding to each facility to be controlled by the plant control system 320 is pre-registered in the block chain 20. The remote service system 6 regularly detects whether or not the public key and the secret key match by automatically executing the secret key confirmation processing program registered in the block chain 20 at predetermined time intervals. Thus, in the process of confirming whether or not the public key and the secret key match, the process of the change request device 100 or the change confirmation device 200, i.e., the operation of the service provider S or the change content confirmer C, is not required.

Figure 12:
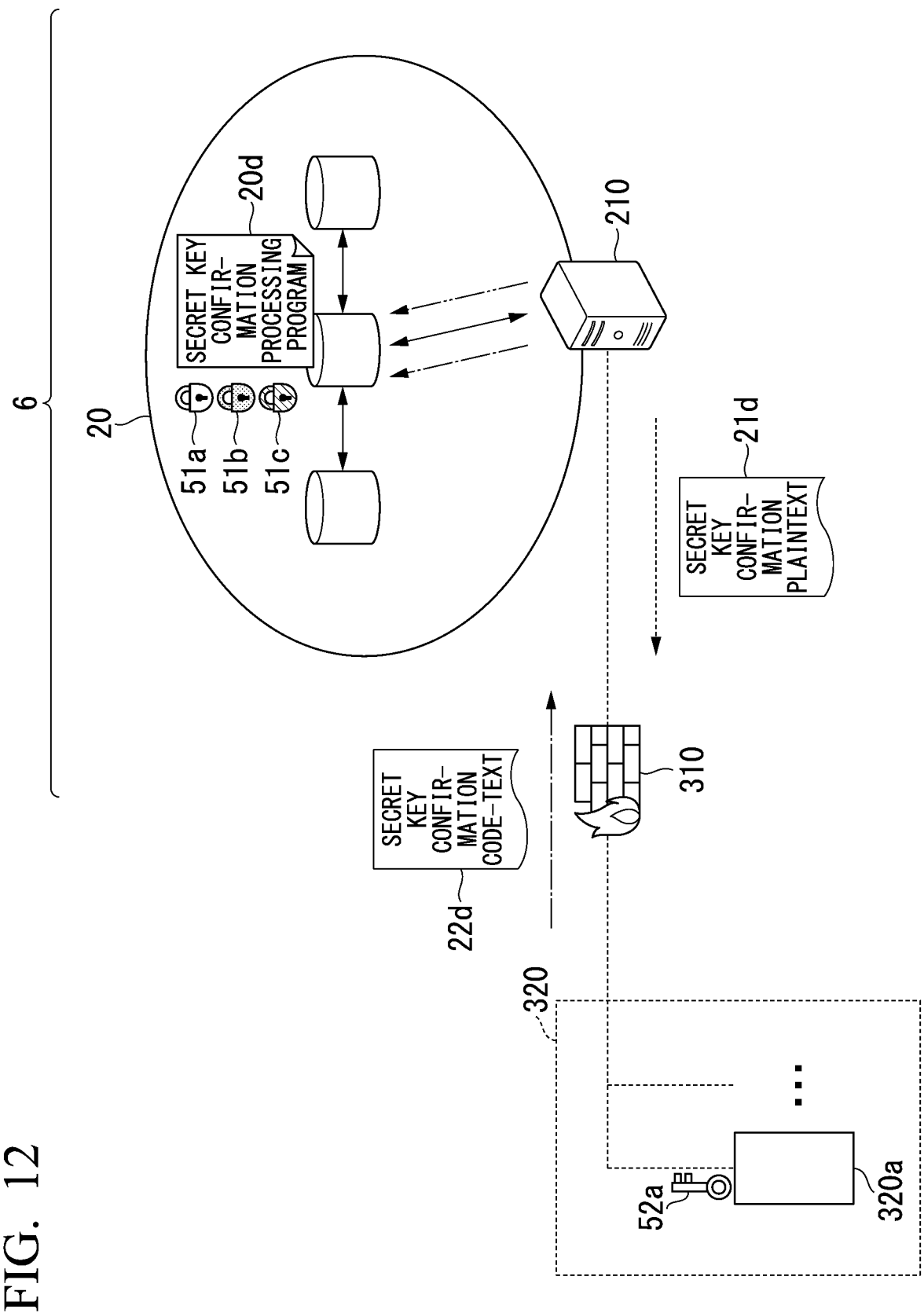
FIG. 12 is a block diagram showing a schematic configuration of a remote service system according to a sixth embodiment.

FIG. 12 is a block diagram showing a schematic configuration of a remote service system according to the sixth embodiment. The remote service system 6 includes a block chain 20 in which a secret key confirmation processing program is registered. FIG. 12 shows a state in which the secret key confirmation processing program 20*d* is registered in the block chain 20. Also, the block chain 20 is connected to a change execution device 210 for transmitting data to and from the plant control system 320. The block diagram shown in FIG. 12 is a configuration for confirming that the public key and the secret key match. More specifically, FIG. 12 shows a configuration for detecting whether or not the secret key 52*a* corresponding to the facility 320*a* to be controlled by the plant control system 320 has been altered. Also, the change request device 100, the service provider S, the change confirmation device 200, and the change content confirmer C of FIG. 10, which are not related to the process of confirming a match between the public key and the secret key, are omitted from FIG. 12.

Also, the other configuration of the remote service system 6 shown in FIG. 12 is similar to the configurations of the remote service system 4 and the remote service system 5. Accordingly, in the following description, the detailed description of a configuration and an operation similar to those of the remote service system 4 and the remote service system 5 will be omitted and a configuration and an operation for confirming the match between the public key and the secret key in the remote service system 6 will be mainly described.

In the remote service system 6, a match between the public key and the secret key is confirmed when the secret key confirmation processing program 20*d* registered in the block chain 20 is automatedly executed at predetermined time intervals as described above. The secret key confirmation processing program 20*d* is a smart contract code program. That is, the secret key confirmation processing program 20*d* is a program that can make it difficult to alter the program and, for example, is not illegally executed by a third party. The secret key confirmation processing program may be a part of the function of the encoding processing program that encodes the usability information using the public key of the corresponding facility described in the remote service system 5. Also, in contrast, a function of a part of the secret key confirmation processing program may be the encoding processing program described in the remote service system 5.

The secret key confirmation processing program 20*d* stores a predetermined public key associated with each facility to be controlled by the plant control system 320. That is, the secret key confirmation processing program 20*d* stores the public key paired with the secret key corresponding to each facility to be controlled by the plant control system 320. In FIG. 12, a state in which the secret key confirmation processing program 20*d* stores a public key 51*a* corresponding to the facility 320*a* to be controlled by the plant control system 320, a public key 51*b* corresponding to the facility 320*b*, and a public key 51*c* corresponding to the facility 320*c* is shown. When the secret key confirmation processing program 20*d* is automatically executed at predetermined time intervals, a match between the secret key corresponding to each facility provided in the plant control system 320 and the stored public key corresponding to each facility is confirmed.

In the process of confirming the match between the secret key and the public key in the secret key confirmation processing program 20d, secret key confirmation plaintext is first transmitted to the plant control system 320. Here, the secret key confirmation plaintext is a string (text) created by the secret key confirmation processing program 20d. The secret key confirmation plaintext may be a predetermined string or any (random) string. Thereby, the plant control system 320 adds the signature to the secret key confirmation plaintext transmitted from the secret key confirmation processing program 20d using the stored secret key and returns the secret key confirmation plaintext to the secret key confirmation processing program 20d. The secret key confirmation processing program 20d confirms the signature added to the secret key confirmation plaintext returned from the plant control system 320 using the stored public key. Thereby, the secret key confirmation processing program 20d determines whether or not the secret key corresponding to each facility of the plant control system 320 matches the stored public key in a pair.

Also, the plant control system 320 encodes the secret key confirmation plaintext using the stored secret key and the encoded secret key confirmation plaintext (hereinafter referred to as secret key confirmation code-text) may be returned to the secret key confirmation processing program 20d. That is, the plant control system 320 may return the secret key confirmation code-text in which a string that is the same as the string of the secret key confirmation plaintext transmitted from the secret key confirmation processing program 20d is encoded to the secret key confirmation processing program 20d. In this case, the secret key confirmation processing program 20d decodes the secret key confirmation code-text returned from the plant control system 320 using the stored public key. The secret key confirmation processing program 20d determines whether or not a pair of the secret key and the public key match by comparing the decoded secret key confirmation code-text (hereinafter referred to as decoded secret key confirmation text) with the secret key confirmation plaintext transmitted to the plant control system 320.

FIG. 12 schematically shows a case in which the secret key confirmation processing program 20d transmits secret key confirmation plaintext to the plant control system 320 and the plant control system 320 returns the secret key confirmation code-text to the secret key confirmation processing program 20d. Also, the change execution device 210 automatedly performs the transmission of secret key confirmation plaintext 21d to the plant control system 320, the reception of secret key confirmation code-text 22d, and the registration of the secret key confirmation code-text 22d in the block chain 20.

Figure 13:
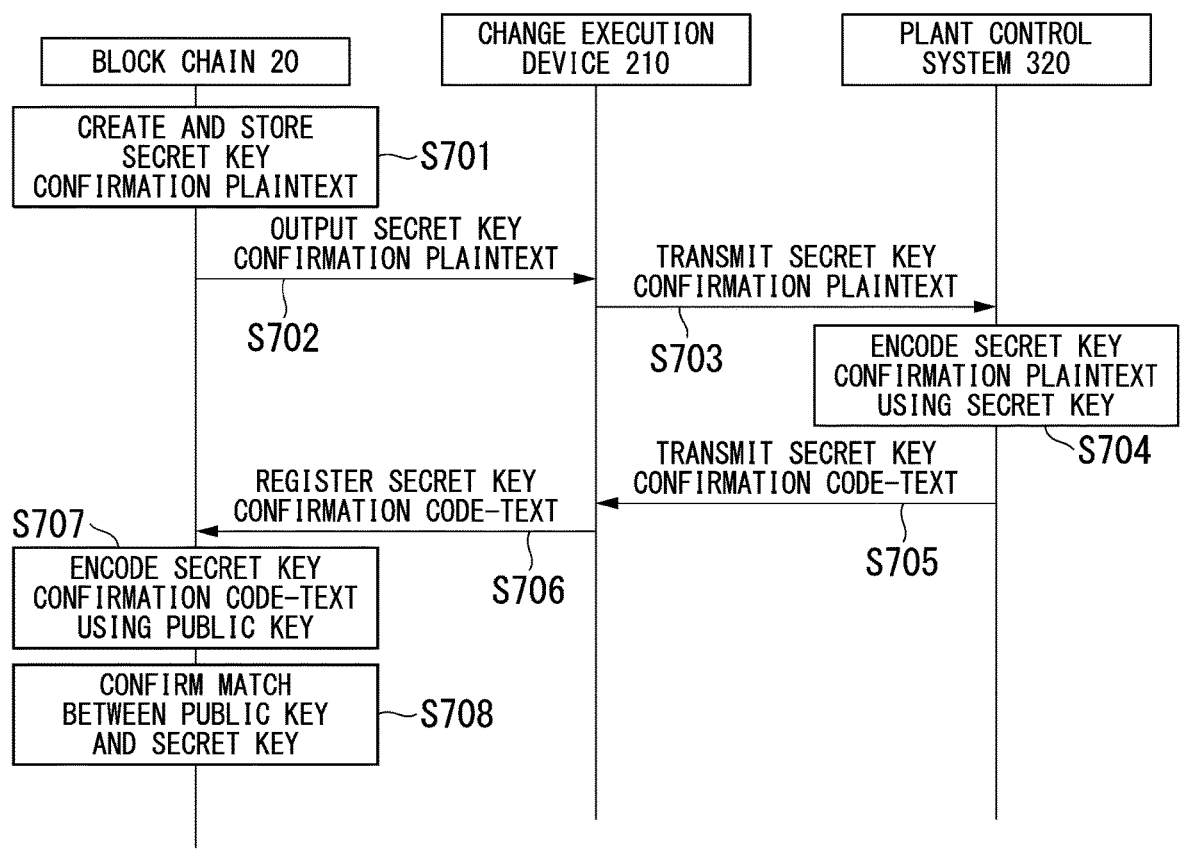
FIG. 13 is a sequence diagram showing a flow of a process in the remote service system of the sixth embodiment.

Next, a process of confirming a match between the public key and the secret key in the facility using the remote service system 6 will be described. FIG. 13 is a sequence diagram showing a process flow in the remote service system 6 according to the sixth embodiment. The processing sequence shown in FIG. 13 is a processing sequence for confirming the match between the public key and the secret key. More specifically, FIG. 13 is a processing sequence when it is confirmed whether or not the public key 51a stored in the secret key confirmation processing program 20d and the secret key 52a stored in the plant control system 320 match. In FIG. 13, an example of a flow of a process in each of the block chain 20 and the change execution device 210 and the plant control system 320 connected to the block chain 20 constituting the remote service system 6 is shown.

Also, the process of the secret key confirmation processing program 20d is shown as the process of the block chain 20.

Also, in the following description, the description will be given under the assumption that the public key corresponding to each facility to be controlled by the plant control system 320 is already stored in the secret key confirmation processing program 20d. That is, the description will be given under the assumption that public keys including the public key 51a corresponding to the facility 320a, the public key 51b corresponding to the facility 320b, and the public key 51c corresponding to the facility 320c are already stored in the secret key confirmation processing program 20d. In the following description, a processing sequence when the plant control system 320 returns secret key confirmation code-text obtained by encoding secret key confirmation plaintext to the secret key confirmation processing program 20d will be described.

If the secret key confirmation processing program 20d is automatedly executed when a predetermined time period has elapsed in the remote service system 6, the secret key confirmation processing program 20d first creates secret key confirmation plaintext 21d and temporarily stores the secret key confirmation plaintext 21d (step S701). Also, the secret key confirmation plaintext 21d created by the secret key confirmation processing program 20d also includes information representing the secret key confirmation plaintext 21d is for which facility to be controlled by the plant control system 320. Accordingly, the secret key confirmation plaintext 21d created by the secret key confirmation processing program 20d in step S701 includes information representing the secret key confirmation plaintext 21d for the facility 320a.

Subsequently, the secret key confirmation processing program 20d outputs data of the created secret key confirmation plaintext 21d to the change execution device 210 (step S702). Thereby, the change execution device 210 transmits the data of the secret key confirmation plaintext 21d output from the secret key confirmation processing program 20d to the plant control system 320 via the direct communication circuit (step S703).

When the data of the secret key confirmation plaintext 21d transmitted from the change execution device 210 via the direct communication circuit is received, the plant control system 320 confirms information representing the secret key confirmation plaintext 21d is for which facility included in the received secret key confirmation plaintext 21d. Subsequently, the plant control system 320 encodes the received data of the secret key confirmation plaintext 21d using the secret key of the corresponding facility (step S704). More specifically, the plant control system 320 confirms that the received secret key confirmation plaintext 21d is the secret key confirmation plaintext 21d for the facility 320a. The plant control system 320 encodes the received data of the secret key confirmation plaintext 21d using the secret key 52d corresponding to the facility 320a to create secret key confirmation code-text 22d.

The plant control system 320 transmits data of the encoded secret key confirmation plaintext, i.e., the secret key confirmation code-text, to the change execution device 210 via the direct communication circuit (step S705). More specifically, the plant control system 320 transmits the data of the created secret key confirmation code-text 22d to the change execution device 210 via the direct communication circuit. Also, the plant control system 320 may automatedly add a signature of the plant control system 320 (a plant signature) to the data of the secret key confirmation code-text 22*d* transmitted to the change execution device 210 and transmit the data to the change execution device 210.

Subsequently, when the data of the secret key confirmation code-text transmitted from the plant control system 320 is received, the change execution device 210 registers the received data of the secret key confirmation code-text in the block chain 20 (step S706). Thereby, the secret key confirmation code-text 22*d* is registered in the block chain 20. The change execution device 210 may automatedly add a signature representing the change execution device 210 to the data of the secret key confirmation code-text registered in the block chain 20, encode the data using a predetermined key (a public key, a secret key, a common key, or the like) of the change execution device 210, and register data of "secret key confirmation code-text+signature" in the block chain 20.

Subsequently, when the data of the secret key confirmation code-text transmitted from the plant control system 320 is registered in the block chain 20, the secret key confirmation processing program 20*d* decodes the registered data of the secret key confirmation code-text using the public key of the corresponding facility (step S707). More specifically, the secret key confirmation processing program 20*d* creates secret key confirmation plaintext 21*d* for the facility 320*a* in step S701. Thus, the secret key confirmation processing program 20*d* decodes the data of the secret key confirmation code-text 22*d* registered in the block chain 20 using the public key 51*a* corresponding to the facility 320*a* and creates the decoded secret key confirmation text.

The secret key confirmation processing program 20*d* confirms a match between the secret key 52*a* corresponding to the facility 320*a* stored in the plant control system 320 and the stored public key 51*a* on the basis of the created decoded secret key confirmation text (step S708). More specifically, the secret key confirmation processing program 20*d* compares a string of the created decoded secret key confirmation text with a string of the transmitted secret key confirmation plaintext and confirms whether or not the strings match. Also, the secret key confirmation processing program 20*d* can determine that the secret key 52*a* has not been altered when the string of the decoded secret key confirmation text matches the string of the secret key confirmation plaintext. On the other hand, the secret key confirmation processing program 20*d* can determine that the secret key 52*a* has been altered when the string of the decoded secret key confirmation text does not match the string of the secret key confirmation plaintext.

Also, the secret key confirmation processing program 20*d* sequentially executes the above-described processing of steps S701 to S708 for each facility to be controlled by the plant control system 320. Thereby, matches between secret keys corresponding to all the facilities to be controlled by the plant control system 320 and the stored public key are confirmed. Thereby, it is possible to confirm (determine) whether or not the secret key has been altered for each facility to be controlled by the plant control system 320.

According to the configuration, the process, and the work flow as described above, the remote service system 6 registers the secret key confirmation processing program 20*d*, which is a smart contract code program for executing a process of confirming the match between the secret key and the public key corresponding to each facility to be controlled by the plant control system 320, in the block chain 20. The secret key confirmation processing program 20*d* is automatedly executed at predetermined time intervals to regularly confirm whether or not the public key and the secret key match. Thereby, for example, it is possible to prevent a malfunction that may occur due to a mismatch between the public key and the secret key such as a malfunction when the usability information for controlling the permission and stopping of use of the service corresponding to each facility to be controlled by the plant control system 320 is not correctly applied to the target facility. Also, it is possible to regularly detect whether or not the secret key stored in the plant control system 320 has been altered when the secret key confirmation processing program 20*d* regularly confirms a match between the public key and the secret key. Thereby, it is possible to prevent alteration of the secret key (including replacement of the secret key) by a third party at a high security level.

Also, a case in which the secret key confirmation processing program 20*d* regularly confirms the match between the public key and the secret key has been described. However, the confirmation of the match between the public key and the secret key in the remote service system 6 is not limited to the regular confirmation and may be irregularly performed, for example, when the service provider S operates the change request device 100 and executes the secret key confirmation processing program 20*d*. Thereby, for example, it is possible to detect whether or not the secret key has been altered at any timing when a mismatch between the public key and the secret key is suspected in a case in which the usability information for controlling the permission and stopping of use of the service corresponding to each facility to be controlled by the plant control system 320 is not correctly applied to the target facility or the like.

Also, a case in which it is detected whether or not the secret key used for decoding the usability information applied to each facility to be controlled by the plant control system 320 has been altered in the remote service system 6 has been described. However, a concept for detecting whether or not the key has been altered is not limited to the secret key used to decode the usability information. For example, in the remote service systems described in the first to fourth embodiments, a concept similar to that of the remote service system 6 may be applied to detecting whether or not a secret key used when a signature is added to change information representing change content of a parameter value of each facility, change content of a setting of the facility, or the like has been altered.

Also, a case in which the secret key confirmation processing program 20*d* detects whether or not the secret key stored in the plant control system 320 has been altered in the remote service system 6 has been described. However, when the reliability of the secret key stored in the plant control system 320 is high, i.e., when it is confirmed that the secret key has not been altered, a process in which the secret key confirmation processing program 20*d* confirms a match between the public key and the secret key may be used to detect whether or not the public key has been altered. Also, as an example in which the public key is likely to be altered, alteration or the like after the public key is extracted outside the block chain 20 instead of direct alteration of the public key registered in the block chain 20 is conceivable. Also, a process in which the secret key confirmation processing program 20*d* confirms the match between the public key and the secret key may be used to detect whether or not each key has been altered.

Also, the detailed description of a processing sequence when it is detected whether a key other than the secret key has been altered is omitted.

As described above, according to the fourth to sixth embodiments, usability information for issuing an instruction for executing or stopping a service such as an additional function from the service provider side that provides the remote service system is registered in the block chain. In the fourth to sixth embodiments, the usability information registered in the block chain is directly transmitted to a control target component (the plant control system 320). Thereby, in the plant to which the remote service systems according to the fourth to sixth embodiments are applied, the service provider side can independently control the permission or stopping of use of a provided service and the like without obtaining the approval of the plant side to receive the service.

Also, when the service provider registers the usability information in the block chain in the fifth embodiment and the sixth embodiment, the usability information for issuing an instruction for executing or stopping a service in each facility is encoded using the public key of a corresponding facility and registered in the block chain. In the fifth embodiment and the sixth embodiment, the usability information directly transmitted to a control target component is decoded using the corresponding secret key and the service is executed in each component (a facility to be controlled by the plant control system 320). Thereby, in the plant to which the remote service systems according to the fifth and sixth embodiments are applied, it is possible to prevent usability information registered by the service provider in the block chain from being erroneously applied to a different component, i.e., prevent the service from being executed by an incorrect component.

Also, in the sixth embodiment, a smart contract code program (the secret key confirmation processing program 20d) for executing a process of confirming a match between a secret key and a public key corresponding to a control target component (the facility 320a to be controlled by the plant control system 320) based on usability information is registered in the block chain. In the sixth embodiment, the smart contract code program is executed regularly or irregularly to confirm whether or not the public key and the secret key match. That is, in the sixth embodiment, it is regularly or irregularly confirmed whether or not the secret key used for decoding the usability information applied to the control target component matches the public key used for encoding the usability information. Thereby, in the plant to which the remote service system of the sixth embodiment is applied, it is possible to prevent a malfunction in which the usability information registered by the service provider in the block chain is not correctly applied due to the mismatch between the public key and the secret key. Also, in the sixth embodiment, the smart contract code program regularly or irregularly confirms the match between the public key and the secret key, thereby detecting the presence or absence of alteration of the key stored in each component. Thereby, it is possible to prevent the key from being altered by a third party at a high security level.

As described above, according to each embodiment of the present invention, the remote service system applies change content sequentially confirmed by a plurality of users to the facility when the users add signatures to change information in a chain (time series) in steps. Also, in each embodiment of the present invention, data used to operate a facility or provide a service such as the change information, the usability information, and the key is maintained at a high security level in various methods. Thereby, in the plant to which the remote service system according to each embodiment of the present invention is applied, it is possible to perform the correct application to a control target facility in a state in which data is maintained at a high security level even if a setting condition of the facility of the plant or a service to be provided is changed from a remote place.

Also, in each embodiment of the present invention, the description has been given under the assumption that each remote service system is applied to a power generation plant. However, the plant to which the remote service system of the present invention is applied is not limited to the power generation plant and can be applied to various plants. Also, a concept of the remote service system of the present invention is not limited to application to the plant and can be applied to various control systems in which it is possible to remotely perform a change or adjustment in a parameter value set in a facility, a change in a setting of the facility, and the like. For example, it is possible to apply a concept of the remote service system of the present invention in a case where a parameter value is updated in a control system of a device installed in a conflict zone or a control system installed in a place that is hard to be visited by people (for example, an offshore wind turbine).

Also, for example, the various processes described above according to the remote service system of each embodiment of the present invention may be performed by recording a program for implementing processes of components for implementing a function of the remote service system such as the change request device 100, the change confirmation device 200, and the change execution device 210 provided in the remote service system 1 on a computer-readable recording medium and causing a computer system to read and execute the program recorded on the recording medium. The "computer system" used here may include an operating system (OS) and hardware such as peripheral devices. The "computer system" is also assumed to include a World Wide Web (WWW) system having a homepage providing environment (or displaying environment). The "computer-readable recording medium" refers to a storage device such as a flexible disc, a magneto-optical disc, a read-only memory (ROM), a writable non-volatile memory such as a flash memory, a portable medium such as a compact disc-ROM (CD-ROM), and a hard disk embedded in the computer system.

Furthermore, the "computer-readable recording medium" is assumed to include a medium that holds a program for a constant period of time, such as a volatile memory (for example, a dynamic random access memory (DRAM)) inside a computer system serving as a server or a client when the program is transmitted via a network such as the Internet or a communication circuit such as a telephone circuit. Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, such as a network (a communication network) like the Internet or a communication circuit (a communication line) like a telephone circuit. Also, the above-described program may be a program for implementing some of the above-described functions. Further, the above-described program may be a program capable of implementing the above-described function in combination with a program already recorded on the computer system, i.e., a so-called differential file (differential program).

Although some embodiments of the present invention have been described above, the present invention is not limited to these embodiments and their modified examples, addition, omission, replacement, and other modifications of the configuration can be adopted within the scope of the present invention.

Also, the present invention is not limited to the above description but is defined only by the appended claims.

INDUSTRIAL APPLICABILITY

According to each embodiment described above, it is possible to provide a remote service system capable of correctly changing settings with maintaining a security level of setting data when a setting condition of a facility in a plant is changed from a remote place.

REFERENCE SIGNS LIST 1, 2, 3, 4, 5, 6 Remote service system
10 Network
20 Block chain
20a, 20b, 20c Signature confirmation processing program
20d Secret key confirmation processing program
21d Secret key confirmation plaintext
22d Secret key confirmation code-text
100 Change request device
200 Change confirmation device
210 Change execution device
300 Plant network device
310 Firewall
320 Plant control system
320a, 320b, 320c Facility
330 Data diode
51a, 51b, 51c Public key
52a, 52b, 52c Secret key

The invention claimed is:

1. A remote service system comprising:
a first computer terminal configured to add a first signature to control information representing control content to be applied to a facility and transmit the control information; and
a second computer terminal configured to cause the control content represented by the control information to be applied to the facility,
wherein the first computer terminal and the second computer terminal are connected by a first communication network,
wherein the second computer terminal and the facility are connected by a second communication network,
wherein the remote service system further comprises a third computer terminal connected to the first communication network and configured to further add a second signature to the control information and transmit the control information when the first signature added to the control information is a correct signature and the control information represents the control content applicable to the facility,
wherein the control information is change information representing change content for changing a setting condition of the facility,
wherein the first computer terminal is configured to receive the change content for the facility, add the first signature to the change information representing the received change content, and transmit the change information,
wherein the third computer terminal is configured to further add the second signature to the change information and transmit the change information when the first signature added to the change information is a correct signature and the change information represents the change content applicable to the facility, and
wherein the second computer terminal is configured to cause the change content represented by the change information to be applied to the facility.

2. The remote service system according to claim 1, wherein the second computer terminal is configured to cause the change content represented by the change information to be applied to the facility when the first signature and the second signature added to the change information are correct signatures.

3. The remote service system according to claim 1, wherein the change information includes facility identification information for identifying the facility to which the change content is applied.

4. The remote service system according to claim 1,
wherein the control information is instruction information representing instruction content for issuing an instruction for executing or stopping an additional function in the facility,
wherein the first computer terminal is configured to add the first signature to the instruction information and transmit the instruction information, and
wherein the second computer terminal is configured to cause the instruction content represented by the instruction information to be applied to the facility.

5. The remote service system according to claim 4, wherein the second computer terminal is configured to cause the instruction content represented by the instruction information to be applied to the facility when the first signature added to the instruction information is a correct signature.

6. The remote service system according to claim 5,
wherein the third computer terminal is configured to receive a request for executing the additional function in the facility, add the second signature to request information representing the received request, and transmit the request information,
wherein the first computer terminal is configured to transmit the instruction information when the second signature added to the request information is a correct signature and the request information is the request applicable to the facility.

7. The remote service system according to claim 1,
wherein the first communication network is a public communication network, and
wherein the second communication network is a dedicated communication circuit.

8. The remote service system according to claim 1,
wherein the first communication network is a communication network in which a block chain is constructed, and
wherein the second communication network is a dedicated communication circuit.

9. The remote service system according to claim 8, wherein a signature confirmation processing program executed by the block chain is configured to confirm whether or not the first signature is a correct signature.

10. The remote service system according to claim 4,
wherein the first communication network is a communication network in which a block chain is constructed and
wherein the second communication network is a dedicated communication circuit directly connected to the facility.

11. The remote service system according to claim 10, wherein the instruction information is encoded using a second key paired with a predetermined first key corresponding to a target facility to which the instruction content is applied.

12. The remote service system according to claim 11, wherein the instruction information is encoded by an encoding processing program executed by the block chain.

13. The remote service system according to claim 12, wherein the encoding processing program is configured to transmit a string to the facility and confirm whether or not the first key matches the second key by confirming a signature, which is added to the string and returned by the facility using the first key, using the second key.

14. The remote service system according to claim 12, wherein the encoding processing program is configured to encode the instruction information before the second computer terminal causes the instruction content to be applied to the target facility.

15. The remote service system according to claim 1, wherein the second computer terminal is configured to transmit an application result transmitted from the facility to which the control content is applied.

16. The remote service system according to claim 15, wherein the second computer terminal is configured to transmit the application result transmitted from the facility via a data diode that performs only one-way communication.

17. The remote service system according to claim 15, wherein a signature representing the facility to which the control content is applied is added to the application result.

18. The remote service system according to claim 15, wherein the application result includes data for calculating efficiency of the facility.

19. The remote service system according to claim 15, wherein the second computer terminal is configured to add a third signature to the application result and transmit the application result.

20. The remote service system according to claim 15, wherein the second computer terminal is configured to transmit log information representing that the control content has been transmitted to the facility.

21. The remote service system according to claim 20, wherein the second computer terminal is configured to add a third signature to the log information and transmit the log information.

22. The remote service system according to claim 20, wherein the second computer terminal is configured to add information of a date and time on which the application result was transmitted from the facility and transmit the information.

23. The remote service system according to claim 22, wherein the second computer terminal is configured to transmit the log information to which information of a date and time on which the control content was transmitted to the facility is added.

24. The remote service system according to claim 23, wherein the first computer terminal is configured to confirm a delay time period until the control content will be applied to the facility on the basis of the information of the date and time added to the log information and the information of the date and time added to the application result.

* * * * *